(12) United States Patent
Tanaka et al.

(10) Patent No.: US 10,454,085 B2
(45) Date of Patent: Oct. 22, 2019

(54) ELECTRODE, ELECTRODE GROUP AND NONAQUEOUS ELECTROLYTE BATTERY

(71) Applicants: KABUSHIKI KAISHA TOSHIBA, Minato-ku (JP); Toshiba Infrastructure Systems & Solutions Corporation, Kawasaki-shi (JP)

(72) Inventors: Masanori Tanaka, Kashiwazaki (JP); Yoshinao Tatebayashi, Kashiwazaki (JP)

(73) Assignees: KABUSHIKI KAISHA TOSHIBA, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 197 days.

(21) Appl. No.: 15/724,706

(22) Filed: Oct. 4, 2017

(65) Prior Publication Data

US 2018/0034026 A1 Feb. 1, 2018

Related U.S. Application Data

(63) Continuation of application No. PCT/JP2016/061274, filed on Apr. 6, 2016.

(30) Foreign Application Priority Data

Apr. 6, 2015 (JP) .................. 2015-077993

(51) Int. Cl.
*H01M 2/16* (2006.01)
*H01M 2/14* (2006.01)
(Continued)

(52) U.S. Cl.
CPC ........... *H01M 2/162* (2013.01); *H01M 2/145* (2013.01); *H01M 2/1626* (2013.01);
(Continued)

(58) Field of Classification Search
CPC .... H01M 2/162; H01M 2/1686; H01M 2/145; H01M 2/1626; H01M 2/1673;
(Continued)

(56) References Cited

U.S. PATENT DOCUMENTS 6,727,017 B1 * 4/2004 Chang ................. H01M 2/1673
29/623.3
9,634,310 B2 * 4/2017 Tokuno ............... H01M 2/1673
(Continued)

FOREIGN PATENT DOCUMENTS

JP  10-012220   1/1998
JP  2007-311151  11/2007
(Continued)

OTHER PUBLICATIONS

International Search Report dated Jul. 12, 2016 in PCT/JP2016/061274 filed Apr. 6, 2016 (with English Translation).
(Continued)

*Primary Examiner* — Amanda C. Walke
(74) *Attorney, Agent, or Firm* — Oblon, McClelland, Maier & Neustadt, L.L.P.

(57) ABSTRACT

The electrode according to an embodiment includes an electrode layer and an organic fiber-containing layer. The organic fiber-containing layer is provided on the electrode layer. The organic fiber-containing layer includes an organic fiber. The organic fiber-containing layer has a ratio tW/tD within a range of 1.1 to 2.55, where tW is a thickness [μm] in a wet state and tD is a thickness [μm] in a dry state. A ratio dW/dD is within a range of 0.95 to 1.05, where dW is an average fiber diameter [nm] of the organic fiber included in the organic fiber-containing layer in the wet state, and dD is an average fiber diameter [nm] of the organic fiber included in the organic fiber-containing layer in the dry state.

14 Claims, 6 Drawing Sheets

(51) Int. Cl.
*H01M 4/131* (2010.01)
*H01M 10/0587* (2010.01)
*H01M 10/04* (2006.01)
*H01M 10/0525* (2010.01)
*H01M 4/485* (2010.01)
*H01M 4/02* (2006.01)

(52) U.S. Cl.
CPC ......... *H01M 2/1686* (2013.01); *H01M 4/131* (2013.01); *H01M 10/0431* (2013.01); *H01M 10/0525* (2013.01); *H01M 10/0587* (2013.01); *H01M 2/1673* (2013.01); *H01M 4/485* (2013.01); *H01M 2004/027* (2013.01); *H01M 2220/20* (2013.01)

(58) Field of Classification Search
CPC .. H01M 4/131; H01M 4/485; H01M 10/0431; H01M 10/0525; H01M 2004/027; H01M 2004/20
USPC .......................................................... 429/249
See application file for complete search history.

(56) References Cited

U.S. PATENT DOCUMENTS

| | | | | | |
|---|---|---|---|---|---|
| 2004/0053123 | A1* | 3/2004 | Chang | ................. | H01M 2/1673 429/144 |
| 2010/0310921 | A1* | 12/2010 | Hayakawa | ............ | H01M 2/145 429/144 |
| 2012/0003524 | A1* | 1/2012 | Jo | ...................... | B01D 67/0013 429/144 |
| 2014/0167329 | A1* | 6/2014 | L'Abee | ................ | D01D 5/0007 264/465 |
| 2015/0093637 | A1* | 4/2015 | Tokuno | ............... | H01M 2/1673 429/211 |
| 2015/0140200 | A1* | 5/2015 | Rouault | ................ | H01M 2/145 427/58 |
| 2015/0162584 | A1* | 6/2015 | Uematsu | ................ | H01M 4/485 429/163 |
| 2016/0141718 | A1* | 5/2016 | Ye | ......................... | H01M 4/583 429/199 |
| 2016/0149183 | A1* | 5/2016 | Keisler | ............... | H01M 2/1613 429/247 |
| 2016/0181626 | A1* | 6/2016 | Madabusi | ........... | H01M 8/0239 429/105 |
| 2016/0308231 | A1* | 10/2016 | Watanabe | ............. | H01M 2/162 |
| 2017/0263908 | A1* | 9/2017 | Laicer | ................. | H01M 2/1686 |
| 2018/0294509 | A1* | 10/2018 | Liu | ........................ | H01M 2/162 |
| 2018/0375148 | A1* | 12/2018 | Yersak | ............... | H01M 10/0562 |
| 2019/0088927 | A1* | 3/2019 | Kusama | ................ | H01M 4/131 |

FOREIGN PATENT DOCUMENTS

| | | |
|---|---|---|
| JP | 2012-033498 | 2/2012 |
| JP | 2012-059486 | 3/2012 |
| JP | 2014-041817 | 3/2014 |
| JP | 2014-139903 | 7/2014 |
| JP | 2014-167938 | 9/2014 |

OTHER PUBLICATIONS

Written Opinion dated Jul. 12, 2016 in PCT/JP2016/061274 filed Apr. 6, 2016.

* cited by examiner

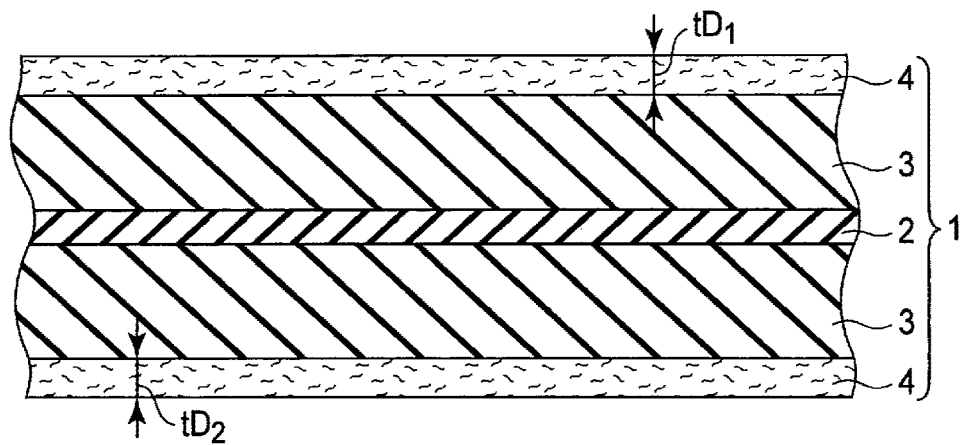
F I G. 2
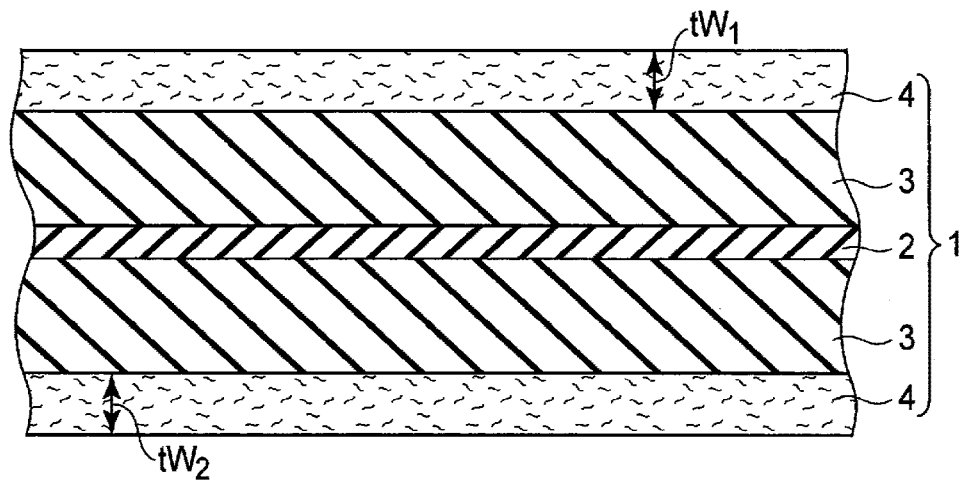
F I G. 3

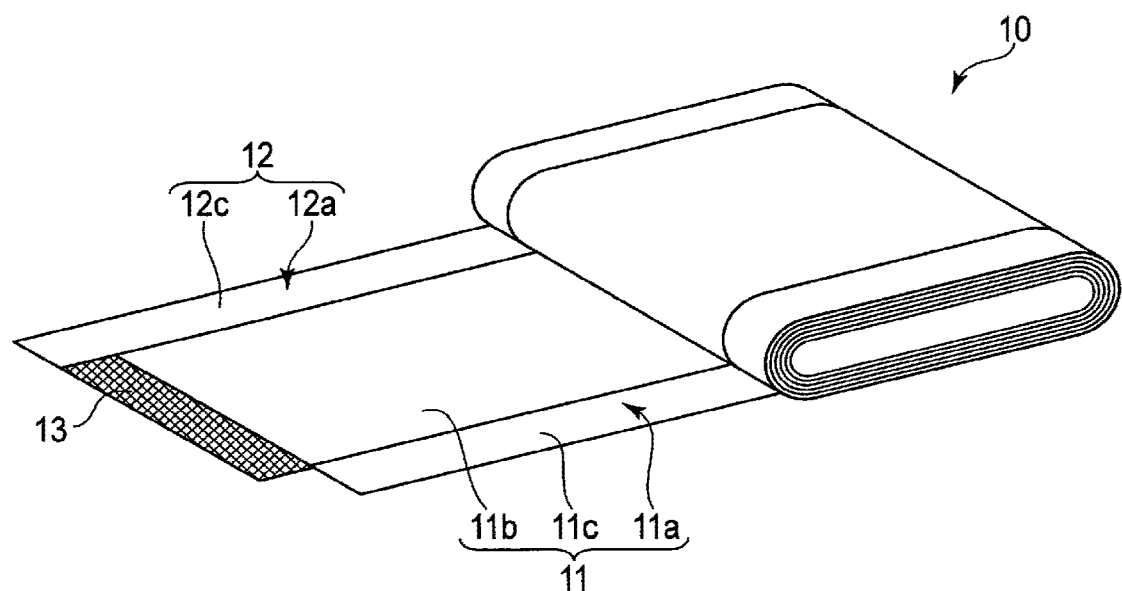
F I G. 4
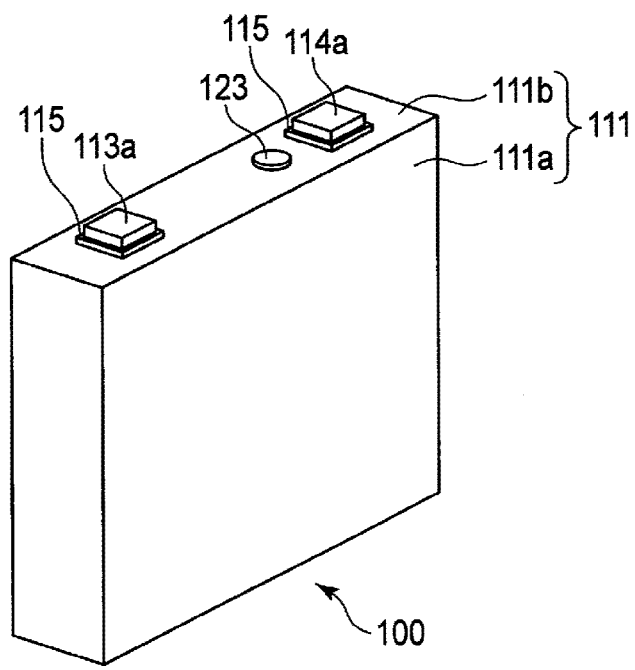
F I G. 5

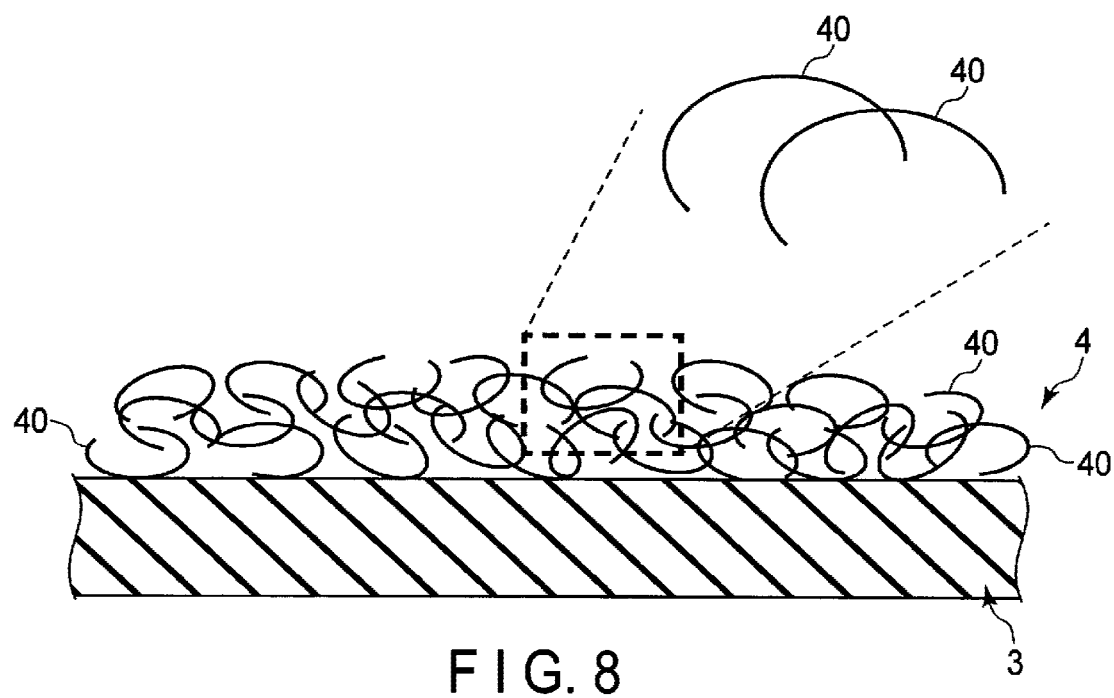
F I G. 8
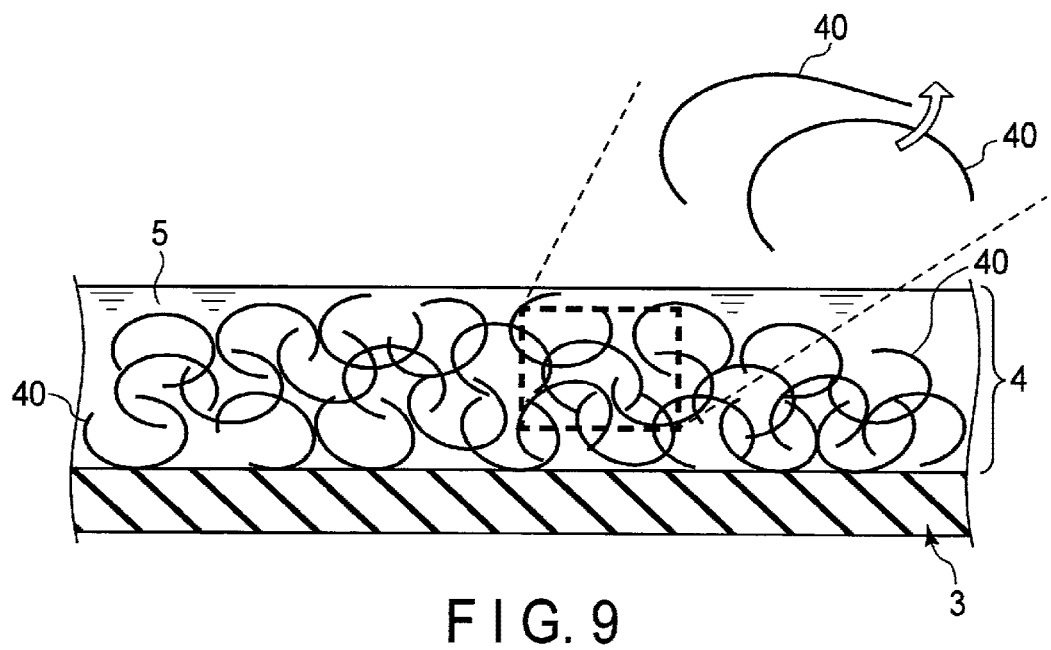
F I G. 9

ELECTRODE, ELECTRODE GROUP AND NONAQUEOUS ELECTROLYTE BATTERY

CROSS-REFERENCE TO RELATED APPLICATIONS

This application is a Continuation Application of PCT Application No. PCT/JP2016/061274, filed Apr. 6, 2016 and based upon and claiming the benefit of priority from the Japanese Patent Application No. 2015-077993, filed Apr. 6, 2015, the entire contents of all of which are incorporated herein by reference.

FIELD

Embodiments described herein relate to an electrode, an electrode group, and a nonaqueous electrolyte battery.

BACKGROUND

Nonaqueous electrolyte batteries capable of charging and discharging, for example lithium-ion secondary batteries, are mainly used as power sources for electric vehicles such as hybrid electric vehicles and plug-in electric vehicles, which are rapidly spread in recent years. A lithium-ion secondary battery is manufactured by, for example, the following method. After an electrode group in which a positive electrode and a negative electrode are wound with a separator provided therebetween is produced, the electrode group is accommodated in a case of metal such as aluminum and an aluminum alloy. Subsequently, a lid is welded to an opening of the case, a liquid nonaqueous electrolyte is injected into the case via a liquid injection port provided in the lid, and then, a sealing member is welded to the liquid injection port, thereby manufacturing a battery unit. After that, initial charge and aging treatment are performed on the battery unit to obtain a lithium-ion secondary battery.

In the nonaqueous electrolyte battery, it is necessary to increase an energy density so as to extend a cruising distance of an electric vehicle. In addition, since acceleration performance is also required, it is necessary to reduce resistance so that high current can be charged and discharged and excellent input-and-output characteristics can be obtained. In order to improve both characteristics regarding the energy density and the resistance, a thickness reduction of a separator and an increase in porosity of the separator are being performing.

A self-supporting thin separator is made to have a high density so as to ensure sufficient tensile strength, and as a result, the porosity becomes small.

Another method of forming a thin separator, there is a method of directly forming a separator on an electrode by coating or the like. If coating is performed by using a gravure roll, a thickness reduction is possible, but there is a problem that the porosity is reduced. In addition, a separator obtained by forming a nonwoven fiber on an electrode by a melt blowing method, an electrospinning method, or the like may be subjected to a hot press after formation of the nonwoven fiber to increase density, so as to increase resistance to damage at the time of manufacturing a battery. Such an increase in density also reduces the porosity of the separator.

Therefore, there is a need to establish a method for achieving both the thickness reduction of the separator and the increase of the porosity of the separator.

BRIEF DESCRIPTION OF THE DRAWINGS

FIG. 2 is an enlarged schematic cross-sectional view of the electrode illustrated in FIG. 1 in a dry state;

FIG. 3 is an enlarged schematic cross-sectional view of the electrode illustrated in FIG. 1 in a wet state;

FIG. 4 is a schematic exploded perspective view of an example of an electrode group according to a second embodiment;

FIG. 5 is a schematic perspective view of an example of a nonaqueous electrolyte battery according to a third embodiment;

FIG. 8 is an enlarged schematic cross-sectional view of an organic fiber-containing layer included in an example of the electrode according to the first embodiment, in a dry state; and FIG. 9 is a schematic enlarged cross-sectional view illustrating a state in which the organic fiber-containing layer illustrated in FIG. 8 is impregnated with a liquid electrolyte.

DETAILED DESCRIPTION

Figure 1:
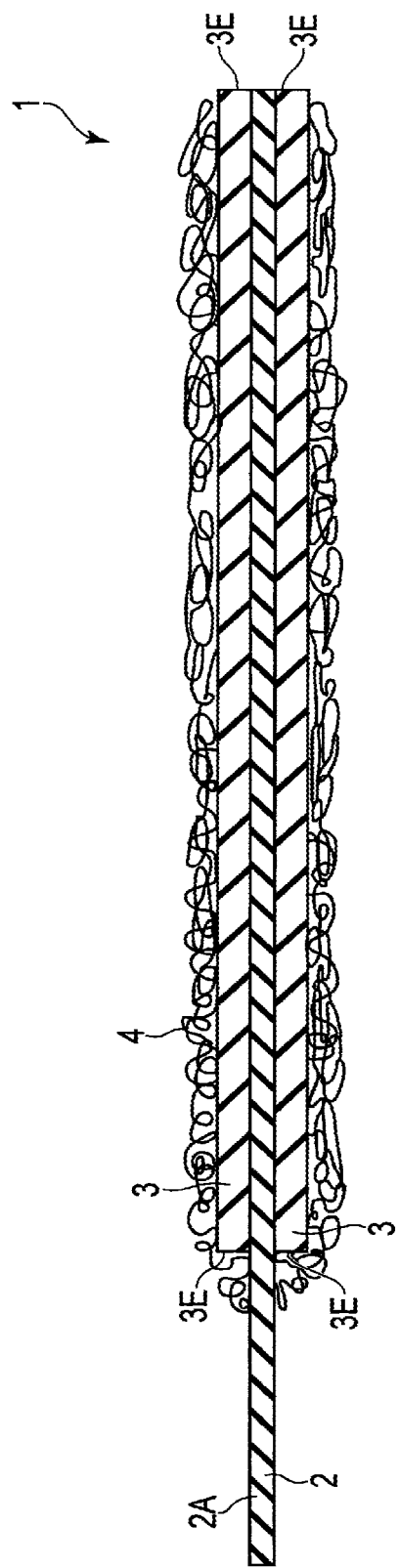
FIG. 1 is a schematic cross-sectional view of an example of an electrode according to a first embodiment.

According to an embodiment, an electrode is provided. The electrode includes an electrode layer and an organic fiber-containing layer. The organic fiber-containing layer is provided on the electrode layer. The organic fiber-containing layer includes an organic fiber. The organic fiber-containing layer has a ratio tW/tD within a range of 1.1 to 2.55, where tW is a thickness [μm] of the organic fiber-containing layer in a wet state and tD is a thickness [μm] of the organic fiber-containing layer in a dry state. The organic fiber-containing layer in the wet state is impregnated with a liquid electrolyte of 500 mg or more per 1 $cm^3$. The organic fiber-containing layer in the dry state has an impregnated amount of the liquid electrolyte per 1 $cm^3$ of 10 mg or less. A ratio dW/dD is within a range of 0.95 to 1.05, where dW is an average fiber diameter [nm] of the organic fiber included in the organic fiber-containing layer in the wet state, and dD is an average fiber diameter [nm] of the organic fiber included in the organic fiber-containing layer in the dry state.

According to an embodiment, an electrode group is provided. The electrode group includes a positive electrode including a positive electrode layer and a negative electrode including a negative electrode layer. The positive electrode or the negative electrode is the electrode according to the embodiment. The organic fiber-containing layer included in the electrode according to the first embodiment is provided between the positive electrode layer and the negative electrode layer.

According to an embodiment, a nonaqueous electrolyte battery is provided. The nonaqueous electrolyte battery includes the electrode group according to the embodiment and a nonaqueous electrolyte impregnated into the electrode group.

The embodiments will be explained below with reference to the drawings. It should be noted that the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

First Embodiment

According to a first embodiment, an electrode is provided. The electrode includes an electrode layer and an organic fiber-containing layer. The organic fiber-containing layer is provided on the electrode layer. The organic fiber-containing layer includes an organic fiber. The organic fiber-containing layer has a ratio tW/tD within a range of 1.1 to 2.55, where tW is a thickness [μm] of the organic fiber-containing layer in a wet state and tD is a thickness [μm] of the organic fiber-containing layer in a dry state. The organic fiber-containing layer in the wet state is impregnated with a liquid electrolyte of 500 mg or more per 1 cm$^3$. The organic fiber-containing layer in the dry state has an impregnated amount of the liquid electrolyte per 1 cm$^3$ of 10 mg or less. A ratio dW/dD is within a range of 0.95 to 1.05, where dW is an average fiber diameter [nm] of the organic fiber included in the organic fiber-containing layer in the wet state, and dD is an average fiber diameter [nm] of the organic fiber included in the organic fiber-containing layer in the dry state.

As an example of using an inorganic material as a separator, there is a method in which an inorganic material and a binder are dissolved in a solvent to prepare a slurry that is directly coated on an electrode, and then dried. The porosity of the separator obtained in this case tends to be low. In a nonaqueous electrolyte battery having the separator with the low porosity, the movement of Li ions is liable to be hindered during charging and discharging, and large-current characteristics are inferior. The result leads to, for example, degradation of acceleration performance in an electric vehicle.

On the other hand, as an example of using an organic fiber as a separator, there is a method in which an organic material is made into fibers by a melt blowing method or an electrospinning method which are coated on an electrode. In this case, a separator exhibiting a high porosity can be obtained. The separator thus obtained can often be subjected to further processing so as to increase resistance to damage during the manufacturing of the electrode group, and to be made a separator which can prevent a short circuit between the positive electrode and the negative electrode. For example, a separator that is difficult to be peeled off can be obtained by coating organic fibers on an electrode, and then compressing the separator by a heated roll press or the like to bond the fibers to each other, or by mixing a binder with the fibers and compressing the separator by roll press or the like. However, even in this case, the porosity of the separator tends to be low.

The organic fiber-containing layer included in the electrode according to the first embodiment has a ratio tW/tD within a range of 1.1 to 2.55, where tW is a thickness [μm] of the organic fiber-containing layer in a wet state and tD is a thickness [μm] of the organic fiber-containing layer in a dry state. Here, the organic fiber-containing layer in the wet state is impregnated with a liquid electrolyte of 500 mg or more per 1 cm$^3$. Further, in the organic fiber-containing layer in the dry state, an impregnated amount of the liquid electrolyte per 1 cm$^3$ is 10 mg or less. That is, the thickness and in turn the apparent volume of the organic fiber-containing layer in the electrode according to the first embodiment can be increased when impregnated with the liquid electrolyte of 500 mg or more per 1 cm$^3$ of the organic fiber-containing layer, as compared with those in the dry state. In addition, a ratio dW/dD of an average fiber diameter dW [nm] of the organic fiber included in the organic fiber-containing layer in the wet state to an average fiber diameter dD [nm] of the organic fiber included in the organic fiber-containing layer in the dry state is within a range of 0.95 to 1.05. That is, the apparent volume of the organic fiber-containing layer included in the electrode according to the first embodiment can be increased when impregnated with the liquid electrolyte of 500 mg or more per 1 cm$^3$ of the organic fiber-containing layer, while the increase in the fiber diameter of the organic fiber can be suppressed due to the impregnation with the liquid electrolyte. As the apparent volume increases but the fiber diameter of the organic fiber hardly changes, a density of the organic fiber-containing layer can be reduced. As a result, the organic fiber-containing layer included in the electrode according to the first embodiment can have a higher porosity in the wet state than in the dry state. That is, the organic fiber-containing layer included in the electrode according to the first embodiment can have a low porosity in the dry state and can have a high porosity in the wet state.

When an electrode group is manufactured by using the electrode according to the first embodiment, the electrode according to the first embodiment can be used in a state in which the organic fiber-containing layer is dried. As described above, the organic fiber-containing layer included in the electrode according to the first embodiment can have a low porosity in the dry state. The organic fiber-containing layer having a low porosity can exhibit high strength. Therefore, when the electrode group is manufactured by using the electrode according to the first embodiment, it is possible to prevent the organic fiber-containing layer from being damaged and, for example, it is possible to prevent a short circuit between the positive electrode and the negative electrode. As a result, the organic fiber-containing layer of the electrode according to the first embodiment can be made thin, and also, a nonaqueous electrolyte battery having a high energy density can be realized.

In addition, if the organic fiber-containing layer can be made thin, it is possible to reduce the resistance that lithium ions encounter during passing through the organic fiber-containing layer. Therefore, the electrode according to the first embodiment, which can make the organic fiber-containing layer thin, can also exhibit excellent input-and-output characteristics.

On the other hand, when a nonaqueous electrolyte battery is manufactured by using the electrode group including the electrode according to the first embodiment, the electrode group can be impregnated with a liquid electrolyte. In the electrode group impregnated with the liquid electrolyte, the organic fiber-containing layer included in the electrode according to the first embodiment can be impregnated with the liquid electrolyte. As described above, the electrode according to the first embodiment can exhibit a high porosity in the wet state. Therefore, the electrode according to the first embodiment can realize a nonaqueous electrolyte battery including a separator having a high porosity.

Thus, the electrode according to the first embodiment can include a thin separator having a high porosity and, as a result, can realize a nonaqueous electrolyte battery that can exhibit a high energy density and excellent input-and-output characteristics.

On the other hand, since the organic fiber-containing layer in which the thickness ratio tW/tD of the organic fiber-containing layer in the electrode according to the first embodiment is smaller than 1.1 can be obtained by press with an extremely low load, the organic fiber is easily damaged in manufacturing the battery and the yield of battery production is lowered. Furthermore, it is found that, when such an organic fiber-containing layer is impregnated with a liquid electrolyte, the organic fiber is made liable to be peeled off from the electrode layer. In addition, as a result of study of the inventors, it is found that, since the organic fiber-containing layer having the thickness ratio tW/tD of greater than 2.55 is obtained by press with an excessive load, the porosity of the organic fiber-containing layer becomes 40% or less even in the wet state, and the resistance becomes too high.

The thickness ratio tW/tD of the organic fiber-containing layer in the electrode according to the first embodiment is preferably from 1.2 to 2.3, and more preferably from 1.3 to 2.1.

When the ratio dW/dD of the average fiber diameter of the organic fiber is smaller than 0.95, the fiber diameter becomes finer in the wet state, that is, the organic fiber dissolves in the liquid electrolyte. Thus, an increase in resistance due to a change in physical properties of the liquid electrolyte or an internal short circuit of the battery due to dissolution of the organic fiber-containing layer is liable to occur. On the other hand, when the ratio dW/dD of the average fiber diameter of the organic fiber is larger than 1.05, the fiber diameter of the organic fiber becomes too large due to impregnation with the liquid electrolyte, even if the thickness ratio tW/tD of the organic fiber-containing layer is within a range of 1.1 to 2.55. Thus, it is difficult for the organic fiber-containing layer to have a high porosity even in the wet state.

The ratio dW/dD of the average fiber diameter of the organic fiber in the electrode according to the first embodiment is preferably from 0.96 to 1.04, and more preferably from 0.98 to 1.02.

The porosity of the organic fiber-containing layer in the dry state is desirably within a range of 40% to 82%. Such an organic fiber-containing layer can be further prevented from being damaged in the dry state, that is, at the time of manufacturing the battery, thereby further suppressing a short circuit between the positive electrode and the negative electrode. Furthermore, even if the porosity of the organic fiber-containing layer of the electrode according to the first embodiment is within a range of 40% to 82% in the dry state, the organic fiber-containing layer can exhibit a high porosity in the wet state. As a result, such an electrode can further reduce the thickness of the organic fiber-containing layer, and can realize a nonaqueous electrolyte battery exhibiting a higher energy density and more excellent input-and-output characteristics.

In the electrode including the organic fiber-containing layer according to the first embodiment, a weight per unit area of the organic fiber-containing layer in the dry state is preferably from 0.5 g/m$^2$ to 4 g/m$^2$, more preferably from 1 g/m$^2$ to 4 g/m$^2$. Since such an organic fiber-containing layer can be further reduced in thickness, it is possible to realize a nonaqueous electrolyte battery having a higher energy density and more excellent input-and-output characteristics.

In the electrode according to the first embodiment, it is preferable that a pressure necessary for pressurizing the organic fiber-containing layer impregnated with the liquid electrolyte so as to make the thickness thereof to tD is 40 N/cm$^2$ or more. Since such an organic fiber-containing layer is resistant to external stress, it is possible to further suppress a short circuit between the positive electrode and the negative electrode due to vibration or the like. As a result, since such an organic fiber-containing layer can be further reduced in thickness, it is possible to realize a nonaqueous electrolyte battery having a higher energy density and more excellent input-and-output characteristics.

Hereinafter, the electrode according to the first embodiment will be described in more detail.

The electrode according to the first embodiment may be a positive electrode or a negative electrode. Alternatively, the electrode according to the first embodiment may be both a positive electrode and a negative electrode.

The positive electrode can include, for example, a positive electrode current collector, and a positive electrode layer provided on the positive electrode current collector. The positive electrode layer may be supported on one surface of the positive electrode current collector, or may be supported on both surfaces thereof. The positive electrode current collector can include a portion which does not support the positive electrode layer. When the electrode according to the first embodiment is the positive electrode, the organic fiber-containing layer is provided on the positive electrode layer which is an electrode layer. In addition, the organic fiber-containing layer may be further supported on the portion of the positive electrode current collector which does not support the positive electrode layer. The positive electrode can also include a positive electrode tab. For example, a portion of the positive electrode current collector which does not support either of the positive electrode layer and the organic fiber-containing layer can also serve as the positive electrode tab. Alternatively, the positive electrode can include the positive electrode tab that is not a portion of the positive electrode current collector.

The positive electrode layer can include a positive electrode active material. The positive electrode layer can further include a conductive agent and a binder if necessary.

The negative electrode can include, for example, a negative electrode current collector, and a negative electrode layer provided on the negative electrode current collector. The negative electrode current collector can include a portion which does not support the negative electrode layer. When the electrode according to the first embodiment is the negative electrode, the organic fiber-containing layer is provided on the negative electrode layer which is an electrode layer. Further, the organic fiber-containing layer may be further supported on a portion of the negative electrode current collector which does not support the negative electrode layer. The negative electrode can also include a negative electrode tab. For example, a portion of the negative electrode current collector which does not support either of the negative electrode layer and the organic fiber-containing layer can also serve as the negative electrode tab. Alternatively, the negative electrode layer can include the negative electrode tab that is not a portion of the negative electrode current collector.

The electrode according to the first embodiment can be manufactured by, for example, the following procedure.

First, an electrode is prepared. The method of manufacturing the electrode is not particularly limited. An example of the method of manufacturing the electrode will be described below.

Subsequently, an organic fiber is directly provided on both surfaces of the electrode by using, for example, an electrospinning method, an ink jet method, a melt blow method, or the like.

Subsequently, the obtained organic fiber is roll-pressed, for example, under the conditions described in Examples described below. It is preferable that a temperature of a roll at the time of the roll press is selected appropriately according to a softening point and a melting point of the organic fiber. That is, it is preferable to perform the roll press at a temperature at which the fiber does not fuse. In this manner, the electrode according to the first embodiment can be obtained. According to the method of the above example, both a positive electrode and a negative electrode can be manufactured.

Next, methods of measuring a thickness tW [μm] of an organic fiber-containing layer in the wet state, a thickness tD [μm] of the organic fiber-containing layer in the dry state, a porosity of the organic fiber-containing layer in the dry state, a weight per unit area of the organic fiber-containing layer in the dry state, an average fiber diameter dW [nm] of the organic fiber included in the organic fiber-containing layer in the wet state, and an average fiber diameter dD [nm] of the organic fiber included in the organic fiber-containing layer in the dry state will be described.

[Thickness tW [μm] of Organic Fiber-Containing Layer in State of Being Impregnated with Liquid Electrolyte, Thickness tD [μm] of Organic Fiber-Containing Layer in Dry State, Porosity of Organic Fiber-Containing Layer in Dry State, and Weight Per Unit Area of Organic Fiber-Containing Layer in Dry State]

First, a nonaqueous electrolyte battery is disassembled and an electrode group is taken out. Subsequently, the taken-out electrode group is provided to a centrifugal separator, and a liquid electrolyte is extracted from the electrode group. The liquid electrolyte is kept because the liquid electrolyte is used for a subsequent measurement. After that, an electrode including an organic fiber-containing layer is taken out from the electrode group and cut into a sample having a square planar shape of 5 cm square.

The obtained sample is sandwiched between thin protective films each having a uniform thickness together with 1 g of the liquid electrolyte previously extracted. The protective film serves to prevent volatilization of the liquid electrolyte. The thickness of the thin protective film is measured in advance. It is preferable that the thin protective film is a thin film having a thickness of 15 μm or less. It is preferable that the protective film is a film made of a material which is hardly dissolved in the liquid electrolyte, such as an aramid resin and a polyolefin resin. It is preferable that the protective film has a size of 7 cm square or more. When sandwiched between the protective films, a part of the liquid electrolyte may come out from the peripheral portion of the protective film. In that case, the liquid electrolyte that has come out may be wiped off with a Kimtowel or the like.

After that, the sample sandwiched between the protective films is sealed in an Al laminate film bag under an environment of a temperature of 25° C. and a dew point of −50° C. or less, and is stored for 5 days. Due to this, the liquid electrolyte is impregnated into the electrode layer and the organic fiber-containing layer. That is, the organic fiber-containing layer included in the sample is in a wet state of being impregnated with the liquid electrolyte of 500 mg or more per 1 cm$^3$. After that, the sample is taken out from the Al laminate film bag, and the thickness measurements of the sample on 10 points are performed while being sandwiched between the protective films and an average value $t_1$ is calculated by using the results.

Next, the protective films sandwiching the sample therebetween are removed, and the sample is immersed in ethyl methyl carbonate for 10 minutes. Thus, the electrolyte can be removed from the sample. Subsequently, the sample is taken out from ethyl methyl carbonate and the solvent is dried under vacuum at 90° C. Due to this drying, the impregnation amount of the liquid electrolyte in the organic fiber-containing layer included in the sample can be reduced to 10 mg or less per 1 cm$^3$. An average value $t_2$ is calculated by performing the thickness measurement of the dried sample on 10 points in the same manner as in the measurement of the thickness $t_1$. At this time, a weight $w_1$ of the sample is measured.

Subsequently, the organic fiber-containing layers on both surfaces are scrubbed off from the sample with a waste cloth such as Kimtowel made by Nippon Paper Cresia Co., Ltd. At this time, it is preferable not to scrub off the electrode layer. After that, similarly to the above, thickness measurements of the sample are performed at 10 points, and an average value $t_3$ is calculated. At this time, a weight $w_2$ of the sample is measured.

On the other hand, the scrubbed organic fiber-containing layer is taken as an organic fiber sample. For the organic fiber sample, a true density $D_1$ is measured by a He gas substitution method.

Subsequently, a sample remaining after scrubbing off the organic fiber sample is sandwiched between protective films having a uniform thickness together with 1 g of the previously extracted liquid electrolyte, as with that described above. Like the above-described protective film, the protective film serves to prevent volatilization of the liquid electrolyte solution. When sandwiched between the protective films, a part of the liquid electrolyte may come out from the peripheral portion of the protective film. In that case, the liquid electrolyte that has come out may be wiped off with a Kimtowel or the like. After that, the sample is sealed in an Al laminate film bag under an environment of a temperature of 25° C. and a dew point of −50° C. or less, and is stored for 5 days. Due to this, the liquid electrolyte is impregnated into the electrode layer. After that, the sample is taken out from the Al laminate film bag, and the thickness measurements of the sample are performed at 10 points while being sandwiched between the protective films, and an average value $t_4$ is calculated.

By subtracting the thickness $t_4$ from the thickness $t_1$ obtained as described above, the thickness tW of the organic fiber-containing layer in the wet state can be obtained. In addition, the thickness tD of the organic fiber-containing layer in the dry state can be obtained by subtracting the thickness $t_3$ from the thickness $t_2$ obtained as described above.

The weight per unit are [g/m$^2$] of the organic fiber-containing layer per one surface in a dry state is obtained by dividing a difference, which is obtained by subtracting the weight $w_2$ from the weight $w_1$ obtained as described above, by an area of the sample and dividing the result by 2.

The porosity [%] of the organic fiber-containing layer in the dry state can be obtained as follows. First, the weight per unit area obtained as described above is divided by the thickness tD obtained as described above. The value thus obtained is taken as the apparent density $D_2$ of the organic fiber-containing layer. By dividing the density $D_2$ by the measured true density $D_1$ of the organic fiber-containing layer, it is possible to calculate a ratio occupied by the organic fibers in the organic fiber-containing layer. By subtracting the ratio from 1, the porosity of the organic fiber-containing layer can be calculated. That is, the porosity of the organic fiber-containing layer can be obtained by substituting the value of the apparent density $D_2$ and the value of the true density $D_1$ into formula: $(1-D_2/D_1)$. The above procedure is performed on 10 samples taken out from different portions and an average thereof is taken.

[Average Fiber Diameter dW [nm] of Organic Fibers Included in Organic Fiber-Containing Layer in Wet State and Average Fiber Diameter dD [nm] of Organic Fibers Included in Organic Fiber-Containing Layer in Dry State]

In the same manner as described above, the sample of the electrode to be measured is obtained from the nonaqueous electrolyte battery. In addition, in the same manner as described above, the liquid electrolyte extracted from the electrode group is kept because the liquid electrolyte is to be used for a subsequent measurement.

Subsequently, the obtained sample is sandwiched between thin protective films each having a uniform thickness together with 1 g of the liquid electrolyte previously extracted. It is preferable that the protective film has a thickness of 15 µm or less. As the protective film used herein, the same protective film as described above can be used. When sandwiched between the protective films, a part of the liquid electrolyte may come out from the peripheral portion of the protective film. In that case, the liquid electrolyte that has come out may be wiped off with a Kimtowel or the like.

After that, the sample sandwiched between the protective films is sealed in an Al laminate film bag under an environment of a temperature of 25° C. and a dew point of −50° C. or less, and is stored for 5 days. Due to this, the liquid electrolyte is impregnated into the organic fiber-containing layer. That is, the organic fiber-containing layer included in the sample is in a wet state of being impregnated with the liquid electrolyte of 500 mg or more per 1 $cm^3$.

After that, the sample is taken out from the Al laminate film bag, and the sample taken out is observed with a confocal laser microscope while being sandwiched between the protective films. Upon observation, the diameters of 50 fibers included in the organic fiber-containing layer are measured to obtain an average value dW. The average value dW is an average diameter of the organic fiber included in the organic fiber-containing layer in the wet state.

Next, the protective films sandwiching the sample therebetween are removed from the sample. Subsequently, the sample is cleaned with a solvent such as ethyl methyl carbonate, and the electrolyte is washed away from the sample. Subsequently, the sample is put in a vacuum dryer of 90° C. to dry the solvent. Note that it is not necessary to wash off the electrolyte remaining on the electrode, but it is preferable to wash the electrolyte off so as not to interfere with the measurement. Subsequently, the dried sample is observed with the confocal laser microscope. Upon observation, the diameters of 50 fibers included in the organic fiber-containing layer are measured to obtain an average value dD. The average value dD is an average diameter of the organic fiber included in the organic fiber-containing layer in the dry state. In order to reduce the influence of the protective films, it is preferable to sandwich the sample between the protective films at the time of observation in the same manner as described above.

Next, a method of measuring the pressure required to pressurize the organic fiber-containing layer in the wet state so as to make the thickness thereof to tD will be described.

In the same manner as described above, the sample of the electrode to be measured is obtained from the nonaqueous electrolyte battery. In addition, in the same manner as described above, the liquid electrolyte extracted from the electrode group is kept because the liquid electrolyte is to be used for a subsequent measurement.

Subsequently, the obtained sample is sandwiched between thin protective films each having a uniform thickness together with 1 g of the liquid electrolyte previously extracted. It is preferable that the protective film has a thickness of 15 µm or less. As the protective film used, the same protective film as described above can be used. When sandwiched between the protective films, a part of the liquid electrolyte may come out from the peripheral portion of the protective film. In that case, the liquid electrolyte that has come out may be wiped off with a Kimtowel or the like.

After that, the sample sandwiched between the protective films is sealed in an Al laminate film bag under an environment of a temperature of 25° C. and a dew point of −50° C. or less, and is stored for 5 days. Due to this, the liquid electrolyte is impregnated into the organic fiber-containing layer.

After that, the sample is taken out from the Al laminate film bag. Subsequently, the sample taken out is pressed with a resinous block while being sandwiched between the protective films. It is preferable that the pressurized area of the block is equal to or larger than the area of the sample. In addition, it is preferable that the weight of the block is 500 g or less. The load required to press the organic fiber-containing layer until the thickness of the organic fiber-containing layer reaches the thickness tD measured in the dry state as described above is divided by the area of the electrode. Thus, the pressure required to pressurize the organic fiber-containing layer in the wet state to make the thickness thereof to tD is obtained.

[Method of Measuring Impregnation Amount of Liquid Electrolyte in Organic Fiber-Containing Layer]

Next, a method of measuring the impregnation amount of the liquid electrolyte in the organic fiber-containing layer will be described.

First, an electrode to be measured is provided. With respect to the electrode incorporated in the nonaqueous electrolyte battery, the electrode group is taken out from the battery, and the electrode having the organic fiber-containing layer is taken out from the electrode group. The extracted electrode is taken as an object to be measured.

Subsequently, 20 electrode samples each having a planar shape of 1 cm square are cut out from the provided electrode.

Next, the volume of 10 electrode samples among the cut-out electrode samples is examined. The volume of the electrode samples can be calculated by the following procedure. First, each electrode sample is sandwiched between the protective films each having the same thickness as described above. Subsequently, the thickness measurements of the sample are performed at 10 points while being sandwiched between the protective films, and an average value is calculated. The calculated result is taken as the thickness of the sample. The volume of each electrode sample can be calculated by multiplying the thickness of this sample by the bottom area of the electrode sample. The average of the volumes of the 10 electrode samples is taken as the volume of the electrode sample.

Subsequently, each of these electrode samples is immersed in an acetone solvent and kept overnight. Thus, the liquid electrolyte impregnated into the electrode sample can be extracted into the acetone solvent. Subsequently, the components in the acetone solvent is quantified by gas chromatography. The average of the amounts of the liquid electrolyte components for the 10 electrode samples is taken as the amount (mg) of the liquid electrolyte impregnated into the electrode sample.

Subsequently, the organic fiber-containing layer is scrubbed off from each of the other ten of the electrode samples in the same manner as described above. Subsequently, the volume of the sample, from which the organic fiber-containing layer is scrubbed off, is measured. The volume of each sample can be examined by the same method as described above. The average of the volumes of the 10 samples is taken as the volume of the electrode layer sample. Subsequently, as described above, the sample is immersed in an acetone solvent and kept overnight. Thus, the liquid electrolyte impregnated into the sample can be extracted into the acetone solvent. Subsequently, the components included in the acetone solvent is quantified by gas chromatography. The average of the amounts of the liquid electrolyte components for the 10 samples is taken as the amount (mg) of the liquid electrolyte impregnated into the electrode layer sample.

Subsequently, the amount of the liquid electrolyte impregnated into the organic fiber-containing layer is obtained by subtracting the amount of the liquid electrolyte impregnated into the electrode layer sample from the amount of the liquid electrolyte impregnated into the electrode sample. On the other hand, the volume of the organic fiber-containing layer is obtained by subtracting the average volume of the electrode layer samples from the average volume of the electrode samples. The impregnation amount of the liquid electrolyte per 1 $cm^3$ of the organic fiber-containing layer can be obtained by dividing the obtained amount of the liquid electrolyte impregnated into the organic fiber-containing layer by the volume (unit: $cm^3$) of the organic fiber-containing layer.

The impregnation amount of the liquid electrolyte for the organic fiber-containing layer included in the electrode at each measurement can be confirmed by the following procedure.

In addition to the sample used for measurement, 40 confirmation samples each having a planar shape of 1 cm square are cut out from the electrode group from which the liquid electrolyte has been removed by centrifugation.

The liquid electrolyte is impregnated into each of these confirmation samples in the Al laminate film bag in the same procedure as in the sample used for measurement of a thickness $t_1$ or a fiber diameter dW.

The impregnation amount of the liquid electrolyte is measured in the procedure described above by using 20 confirmation samples among the confirmation samples impregnated with the liquid electrolyte. This impregnation amount can be regarded as being similar to the impregnation amount of the liquid electrolyte in the organic fiber-containing layer included in the sample used for the measurement of the thickness $t_1$ or the fiber diameter dW.

The electrolyte is removed from each of the remaining 20 confirmation samples in the same procedure as in the sample used for the measurement of the thickness $t_2$ or the fiber diameter dD, and each of the confirmation samples is dried under vacuum in the same procedure as in the sample used for the measurement of the thickness $t_2$ or the fiber diameter dD. The impregnation amount of the liquid electrolyte is measured in the procedure described above by using each of the vacuum-dried 20 confirmation samples. This impregnation amount can be regarded as being similar to the impregnation amount of the liquid electrolyte in the organic fiber-containing layer included in the sample used for the measurement of the thickness $t_2$ or the fiber diameter dD.

Next, the materials that can be used in the first embodiment will be described.

(1) Positive Electrode

In a case where the electrode according to the first embodiment is the positive electrode, the following materials can be used.

The positive electrode current collector can be made of, for example, a metal foil. As a material of the metal foil which can form the positive electrode current collector, for example, aluminum or an aluminum alloy can be used.

As described above, the positive electrode layer can include a positive electrode active material.

The positive electrode active material is not particularly limited, and examples thereof may include various oxides such as lithium-containing cobalt oxide (for example, $LiCoO_2$), manganese dioxide, lithium-manganese composite oxide (for example, $LiMn_2O_4$ or $LiMnO_2$), lithium-containing nickel oxide ($LiNiO_2$), lithium-containing nickel cobalt oxide (for example, $LiNi_{0.8}Co_{0.2}O_2$), lithium-containing iron oxide, lithium-containing vanadium oxide, chalcogen compounds such as titanium disulfide or molybdenum disulfide, and the like. The kind of the positive electrode active material used can be one kind or two or more kinds.

As described above, the positive electrode layer can further include a conductive agent and a binder if necessary.

The conductive agent is added if necessary, in order to increase the current-collecting performance and to suppress the contact resistance between the positive electrode active material and the positive electrode current collector. Examples of the conductive agent in the positive electrode layer can include an acetylene black, a carbon black, artificial graphite, natural graphite, and the like.

The binder has a function to bind the positive electrode active material and the positive electrode current collector. As the binder in the positive electrode layer, it is possible to use, for example, polytetrafluoroethylene (PTFE), polyvinylidene fluoride (PVdF), modified PVdF in which at least one of hydrogen and fluorine of PVdF is substituted with another substituent, a copolymer of vinylidene fluoride and hexafluoropropylene, a terpolymer of polyvinylidene fluoride, tetrafluoroethylene, and hexafluoropropylene, and the like.

The positive electrode can be made, for example, as follows.

First, the positive electrode active material, an optional conductive agent, and a binder are put into an appropriate solvent, for example, N-methylpyrrolidone, and suspended to prepare a positive electrode slurry.

When preparing the positive electrode slurry, a blending ratios of the positive electrode active material, the conductive agent, and the binder are preferably in a range of 75% by mass to 96% by mass of the positive electrode active material, 3% by mass to 20% by mass of the conductive agent, and 1% by mass to 7% by mass of the binder.

The slurry obtained as described above is coated on the positive electrode current collector. After that, the coated slurry is dried and rolled by, for example, roll press.

Thus, a positive electrode including the positive electrode current collector and the positive electrode layer provided on the positive electrode current collector can be obtained.

(2) Negative Electrode

In a case where the electrode according to the first embodiment is the negative electrode, the following materials can be used.

It is preferable that the negative electrode current collector is made of a material that is electrochemically stable in a potential range where insertion and extraction of lithium ions occur in the negative electrode layer. Examples of such materials include copper, nickel, stainless steel, aluminum, and aluminum alloys. It is preferable that the aluminum alloys include one or more elements selected from Mg, Ti, Zn, Mn, Fe, Cu, and Si.

As described above, the negative electrode layer can include a negative electrode active material.

The negative electrode active material is not particularly limited, and examples thereof can include a graphite material or a carbonaceous material (for example, graphite, coke, carbon fiber, spherical carbon, carbonaceous material obtained by the pyrolytic of the gaseous carbonaceous substance, a resin baked material, or the like), a chalcogen compound (for example, titanium disulfide, molybdenum disulfide, niobium selenide, or the like), light metal (for example, aluminum, an aluminum alloy, a magnesium alloy, a lithium, lithium alloy, or the like), a titanium-containing composite oxide such as titanium oxide or a lithium-titanium composite oxide (for example, spinel-type lithium titanate), and the like.

As described above, the negative electrode layer can further include a conductive agent and a binder if necessary.

The conductive agent is added if necessary, in order to increase the current-collecting performance and to suppress the contact resistance between the negative electrode active material and the negative electrode current collector. As the conductive agent in the negative electrode layer, for example, a carbon material can be used. Examples of the carbon material can include an acetylene black, a carbon black, a coke, a carbon fiber, graphite, and the like.

The binder has a function to bind the negative electrode active material and the negative electrode current collector. As the binder in the negative electrode material layer, it is possible to use, for example, polytetrafluoroethylene (PTFE), polyvinylidene fluoride (PVdF), ethylene-propylene-diene copolymer (EPDM), styrene-butadiene rubber (SBR), carboxymethyl cellulose (CMC), and the like.

The negative electrode can be made, for example, as follows.

First, the negative electrode active material, the binder, and, if necessary, the conductive agent are suspended in a commonly used solvent such as N-methylpyrrolidone to produce a slurry for preparing the negative electrode.

It is preferable that, when preparing the slurry, the negative electrode active material, the conductive agent, and the binder are blended in a proportion within a range of 70% by mass to 96% by mass, 2% by mass to 20% by mass, and 2% by mass to 10% by mass, respectively. When the content of the conductive agent is set to be 2% by mass or more, the current-collecting performance of the negative-electrode-mixture layer can be improved. In addition, when the content of the binder is 1% by mass or more, the binding property between the negative electrode layer and the negative electrode current collector can be enhanced, and excellent cycle characteristics can be expected. On the other hand, in order to increase the capacity, it is preferable that the contents of the conductive agent and the binder are respectively 16% by mass or less.

The slurry obtained as described above is coated on the negative electrode current collector. After that, the slurry coated on the negative electrode current collector is dried and pressed by, for example, roll press.

Thus, a negative electrode including the negative electrode current collector and the negative electrode layer provided on the negative electrode current collector can be obtained.

(3) Organic Fiber-Containing Layer

The organic fiber-containing layer can include a fiber made of an organic material. The organic material is not particularly limited, and examples thereof can include, in addition to polyolefin such as polyethylene or polypropylene, ethylene-propylene copolymer, ethylene-butene copolymer, cellulose, polyamide, polyimide, polyamide-imide, polyether, polyketone, polysulfone, polyvinyl alcohol (PVA), polyvinylidene fluoride (PVdF), and the like.

It is preferable that the organic fiber includes at least one organic compound selected from the group consisting of polyimide, polyamide, polyamide-imide, polyvinylidene fluoride, polyolefin, cellulose, polyvinyl alcohol, and polyacrylonitrile.

Next, the electrode according to the first embodiment will be more specifically described with reference to the drawings.

FIG. 1 is a schematic cross-sectional view of an example of an electrode according to the first embodiment. FIG. 2 is an enlarged schematic cross-sectional view of the electrode illustrated in FIG. 1 in a dry state. FIG. 3 is an enlarged schematic cross-sectional view of the electrode illustrated in FIG. 1 in a wet state.

The electrode 1 illustrated in FIG. 1 includes a belt-shaped current collector 2. The current collector 2 supports electrode layers 3 on both surfaces thereof. The current collector 2 includes a portion 2A which does not support the electrode layer 3.

The electrode 1 illustrated in FIG. 1 further includes an organic fiber-containing layer 4. The organic fiber-containing layer 4 is provided on the surface of the electrode layer 3 including an edge surface 3E of the electrode layer 3. In addition, the organic fiber-containing layer 4 is also supported on a part of the portion 2A of the current collector 2 which does not support the electrode layer 3.

As illustrated in FIG. 2, in a case where the organic fiber-containing layers are in a dry state, the thicknesses of the organic fiber-containing layers in the electrode 1 are $tD_1$ and $tD_2$, respectively. In addition, as illustrated in FIG. 3, in a case where the organic fiber-containing, layers are in a wet state, the thicknesses of the organic fiber-containing layers in the electrode 1 are $tW_1$ and $tW_2$, respectively.

An average value of the thickness $tW_1$ and the thickness $tW_2$ is a thickness tW of the organic fiber-containing layers 4 in the wet state. In addition, an average value of the thickness $tD_1$ and the thickness $tD_2$ is a thickness tD of the organic fiber-containing layers 4 in the dry state.

According to the first embodiment, the electrode including the organic fiber-containing layer is provided. The organic fiber-containing layer has a ratio tW/tD within a range of 1.1 to 2.55. Here, tW is the thickness [μm] of the organic fiber-containing layer in the wet state and tD is the thickness [μm] of the organic fiber-containing layer in the dry state. A ratio dW/dD of an average fiber diameter dW [nm] of the organic fiber included in the organic fiber-containing layer in the wet state to an average fiber diameter dD [nm] of the organic fiber included in the organic fiber-containing layer in the dry state is within a range of 0.95 to 1.05. Due to these, the electrode according to the first embodiment can include a thin organic fiber-containing layer having a high porosity. As a result, the electrode according to the first embodiment can realize a nonaqueous electrolyte battery exhibiting a high energy density and excellent input-and-output characteristics.

Second Embodiment

According to a second embodiment, an electrode group is provided. The electrode group includes a positive electrode including a positive electrode layer and a negative electrode group including a negative electrode layer. At least one of the positive electrode and the negative electrode is the electrode according to the first embodiment. The organic fiber-containing layer included in the electrode according to the first embodiment is provided between the positive electrode layer and the negative electrode layer.

Since the electrode group according to the second embodiment includes the electrode according to the first embodiment, it is possible to realize a nonaqueous electrolyte battery exhibiting a high energy density and excellent input-and-output characteristics.

At least one of the positive electrode and the negative electrode included in the electrode group according to the second embodiment may be the electrode according to the first embodiment. Therefore, in the electrode group according to the second embodiment, both the positive electrode and the negative electrode may be the electrodes according to the first embodiment.

The electrode group according to the second embodiment can have, for example, a wound-type structure. The wound-type electrode group has a structure in which there is wound a stack that is formed by stacking a positive electrode and a negative electrode with an organic fiber-containing layer provided between a positive electrode layer and a negative electrode layer. For example, the wound-type electrode group may have a flat shape having a cross-section having a long diameter and a short diameter.

Alternatively, the electrode group according to the second embodiment can have a stack-type structure. The stack-type electrode group has a structure in which a plurality of positive electrodes and a plurality of negative electrodes are alternately stacked.

In the electrode group according to the second embodiment, it is preferable that the thickness of the organic fiber-containing layer hardly changes with pressurization. Specifically, it is preferable that the electrode group satisfies the relational expression: $0<(TL-TH)/(tW \times n) \leq 0.1$, where TL [mm] is the thickness when pressurized at 101.3 kPa in a state in which the organic fiber-containing layer is in the wet state, TH [mm] is the thickness when pressurized at 202.6 kPa in a state in which the organic fiber-containing layer is in the wet state, and n is the number of organic fiber-containing layers in a thickness direction of the electrode group. When the electrode group according to the second embodiment satisfies the above relational expression, there can be further suppressed a short circuit between the positive electrode and the negative electrode due to vibration or the like. Thus, the thickness of the organic fiber-containing layer can be further reduced. As a result, such an electrode group can realize a nonaqueous electrolyte battery having a higher energy density and more excellent input-and-output characteristics.

Here, the thickness direction of the electrode group means a direction of the short diameter of the cross-section when the electrode group is the wound-type electrode group having the flat shape. Alternatively, when the electrode group has the stack-type structure, the thickness direction of the electrode group is a stacking direction in which the positive electrode and the negative electrode are stacked. In addition, the pressurizing direction is the thickness direction of the electrode group.

Hereinafter, a method of measuring the thicknesses TH and TL of the electrode group described above and a method of determining the number of the organic fiber-containing layers described above will be described.

First, a nonaqueous electrolyte battery is disassembled and an electrode group is taken out. Subsequently, under an environment of a temperature of 25° C. and a dew point of −50° C. or less, the electrode group is put in a bag made of Al laminate film together with a liquid electrolyte and is sealed at a gauge pressure of −70 kPa. At this time, it is preferable that the size of the bag is close to that of the electrode group. In addition, the thickness of the bag is measured in advance. It is preferable that the amount of the liquid electrolyte to be sealed together with the electrode group is 1 mg to 2 mg per 1 Ah.

After that, the sample is stored for 5 days. Due to this, the liquid electrolyte is impregnated into the organic fiber-containing layer. That is, the organic fiber-containing layer included in the sample is in a wet state of being impregnated with an electrolytic solution of 500 mg or more per 1 $cm^3$ of the organic fiber-containing layer.

After that, the electrode group is sandwiched between resinous blocks in the thickness direction, a pressure of 101.3 kPa is applied to a contact area between the resinous block and the electrode group, and the thickness of the electrode group put in the bag is measured. The thickness TL is obtained by subtracting the thickness of the bag from the measured thickness. Here, it is preferable that the size of the block used for pressurization is equal to or larger than that of the electrode group, and the weight of the block is 500 g or less.

Subsequently, the pressure is increased to 202.6 kPa, and the thickness of the electrode group is measured in the same manner as described above. The thickness TH is obtained by subtracting the thickness of the bag from the measured thickness.

After that, the electrode group is taken out from the Al laminate film bag. The electrode group taken out is filled in the resin and cut to obtain the cross-section thereof, and the organic fiber layers in the thickness direction of the electrode group are counted. The number of layers thus determined is the number n of the organic fiber-containing layers. Here, as described above, the thickness direction of the electrode group means a direction of the short diameter of the cross-section of the electrode group when the electrode group is the wound-type electrode group having the flat shape. In addition, in this case, the number $n_1$ of the organic fiber-containing layers can be obtained by doubling the number of the organic fiber-containing layers counted from the winding center. Alternatively, when the electrode group has the stack-type structure, the thickness direction of the electrode group is a direction in which the positive electrode and the negative electrode are stacked. Therefore, the number $n_2$ of the organic fiber-containing layers in this case is the number of the organic fiber-containing layers in the stacking direction of the electrode group.

As the materials of the positive electrode, the negative electrode, and the organic fiber-containing layer included in the electrode group according to the second embodiment, it is possible to use, for example, those described in the first embodiment.

Next, the electrode group according to the second embodiment will be more specifically described with reference to the drawings.

FIG. 4 is a schematic exploded perspective view of an example of the electrode group according to the second embodiment.

An electrode group 10 illustrated in FIG. 4 includes a positive electrode 11 and a negative electrode 12.

The positive electrode 11 includes a belt-shaped positive electrode current collector 11a, and positive electrode layers 11b (one of which is not illustrated) provided on both surfaces of the positive electrode current collector. The positive electrode current collector 11a includes a portion 11c which does not support the positive electrode layer 11b. The portion 11c functions as a positive electrode tab of the electrode group 10.

The negative electrode 12 includes a belt-shaped negative electrode current collector 12a. The negative electrode 12 further includes a negative electrode layer (not illustrated). The negative electrode layer is provided on both surfaces of the negative electrode current collector 12a. The negative electrode current collector 12a includes a portion 12c which does not support the negative electrode layer. The portion 12c functions as a negative electrode tab of the electrode group 10. The negative electrode 12 further includes an organic fiber-containing layer 13. The organic fiber-containing layer 13 is provided on the negative electrode layer. The organic fiber-containing layer 13 is also provided on the edge surface of the negative electrode layer.

The positive electrode 11 and the negative electrode 12 are stacked to form a stack in a state in which the organic fiber-containing layer is sandwiched between the positive electrode layer 11b and the negative electrode layer. In addition, the positive electrode tab 11c and the negative electrode tab 12c protrude from the stack in opposite directions to each other. The stack including the positive electrode 11 and the negative electrode 12 is wound in a flat shape as illustrated in FIG. 4 to form the electrode group 10.

The electrode group according to the second embodiment includes the electrode according to the first embodiment. Thus, the electrode group can achieve a nonaqueous electrolyte battery exhibiting high energy density and excellent input-and-output characteristics.

Third Embodiment

According to a third embodiment, a nonaqueous electrolyte battery is provided. The nonaqueous electrolyte battery includes the electrode group according to the second embodiment and a nonaqueous electrolyte impregnated into the electrode group.

The nonaqueous electrolyte battery according to the third embodiment can further include a container member which accommodates the electrode group and the nonaqueous electrolyte.

The nonaqueous electrolyte battery according to the third embodiment can further include a positive electrode terminal electrically connected to the positive electrode of the electrode group, and a negative electrode terminal electrically connected to the negative electrode of the electrode group. Each of the positive electrode terminal and the negative electrode terminal can be attached to the container member, for example, with an insulating member interposed therebetween. Alternatively, the container member may be either the positive electrode terminal or the negative electrode terminal.

Next, the nonaqueous electrolyte, the container member, the positive electrode terminal, the negative electrode terminal, and the insulating member which can be used in the nonaqueous electrolyte battery according to the third embodiment are explained.

(1) Nonaqueous Electrolyte

As the nonaqueous electrolyte, it is possible to use a product prepared by dissolving an electrolyte (for example, a lithium salt) in a nonaqueous solvent.

The nonaqueous solvent may include, for example, ethylene carbonate (EC), propylene carbonate (PC), butylene carbonate (BC), dimethyl carbonate (DMC), diethyl carbonate (DEC), ethylmethyl carbonate (EMC), γ-butyrolactone (γ-BL), sulpholane, acetonitrile, 1,2-dimethoxyethane, 1,3-dimethoxypropane, dimethyl ether, tetrahydrofuran (THF), 2-methyltetrahydrofuran, and the like. One nonaqueous solvent may be used alone or a mixture of two or more nonaqueous solvents may be used.

The electrolyte may include, for example, lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), and lithium trifluoromethanesulfonate ($LiCF_3SO_3$). One electrolyte may be used alone or a mixture of two or more electrolytes may be used. It is preferable that an dissolved amount of the electrolyte to the nonaqueous solvent is adjusted to 0.2 mol/L to 3 mol/L. When the concentration of the electrolyte is too low, sufficient ion-conductivity may not be obtained. On the other hand, when the amount of the electrolyte supplied to the nonaqueous solvent is too large, the electrolyte may not be completely dissolved in the nonaqueous solvent.

(2) Container Member

In the nonaqueous electrolyte battery according to the third embodiment, it is preferable that the container member is a prismatic container having a bottom. However, the container member which can be included in the nonaqueous electrolyte battery according to the third embodiment is not particularly limited, and container members having various shapes can be used according to their intended use.

As the container member, a metal container member may be used, for example. As the material for the container member, aluminum, aluminum alloy, iron (Fe), iron plated with nickel (Ni), and stainless steel (SUS) may be used, for example.

Alternatively, the container member may be made of a laminate film, for example. As the laminate film, it is possible to use a film formed of a metal layer and two resin layers sandwiching the metal layer therebetween.

(3) Positive Electrode Terminal and Negative Electrode Terminal

It is desirable to form the positive electrode terminal and the negative electrode terminal from, for example, aluminum or aluminum alloy.

The connection of the positive electrode terminal to the positive electrode can be performed, for example, via a positive electrode lead. Similarly, the connection of the negative electrode terminal to the negative electrode can be performed, for example, via a negative electrode lead. It is preferable that the positive electrode lead and the negative electrode lead are formed, for example, from aluminum or aluminum alloy. (3) Insulating Member As a material for the insulating member, for example, a resin may be used. As a resin used for the insulating member, any resin can be used so long as it is resistant to the liquid electrolyte. For example, polyethylene, polypropylene, an ethylene-vinyl acetate copolymer, an ethylene-vinyl acetate-alcohol copolymer, an ethylene-acrylic acid copolymer, an ethylene-ethyl acrylate copolymer, an ethylene-methacrylate copolymer, an ethylene-methacrylate-acrylate copolymer, an ethylene-methyl methacrylate copolymer, ionomer, polyacrylonitrile, polyvinylidene chloride, polytetrafluoroethylene, polychlorotrifluoroethylene, polyphenylene ether, polyethylene terephthalate, or polytetrafluoroethylene can be used. One of the resins described above may be used alone or a mixture of multiple kinds of resins may be used. Among these, it is preferable to use polypropylene or polyethylene.

Next, an example of the nonaqueous electrolyte battery according to the third embodiment will be described in detail with reference to FIGS. 5 to 7.

FIG. 5 is a schematic perspective view of an example of a nonaqueous electrolyte battery according to a third embodiment. FIG. 6 is one exploded perspective view of the nonaqueous electrolyte battery illustrated in FIG. 5. FIG. 7 is another exploded perspective view of the nonaqueous electrolyte battery illustrated in FIG. 5.

Figure 6:
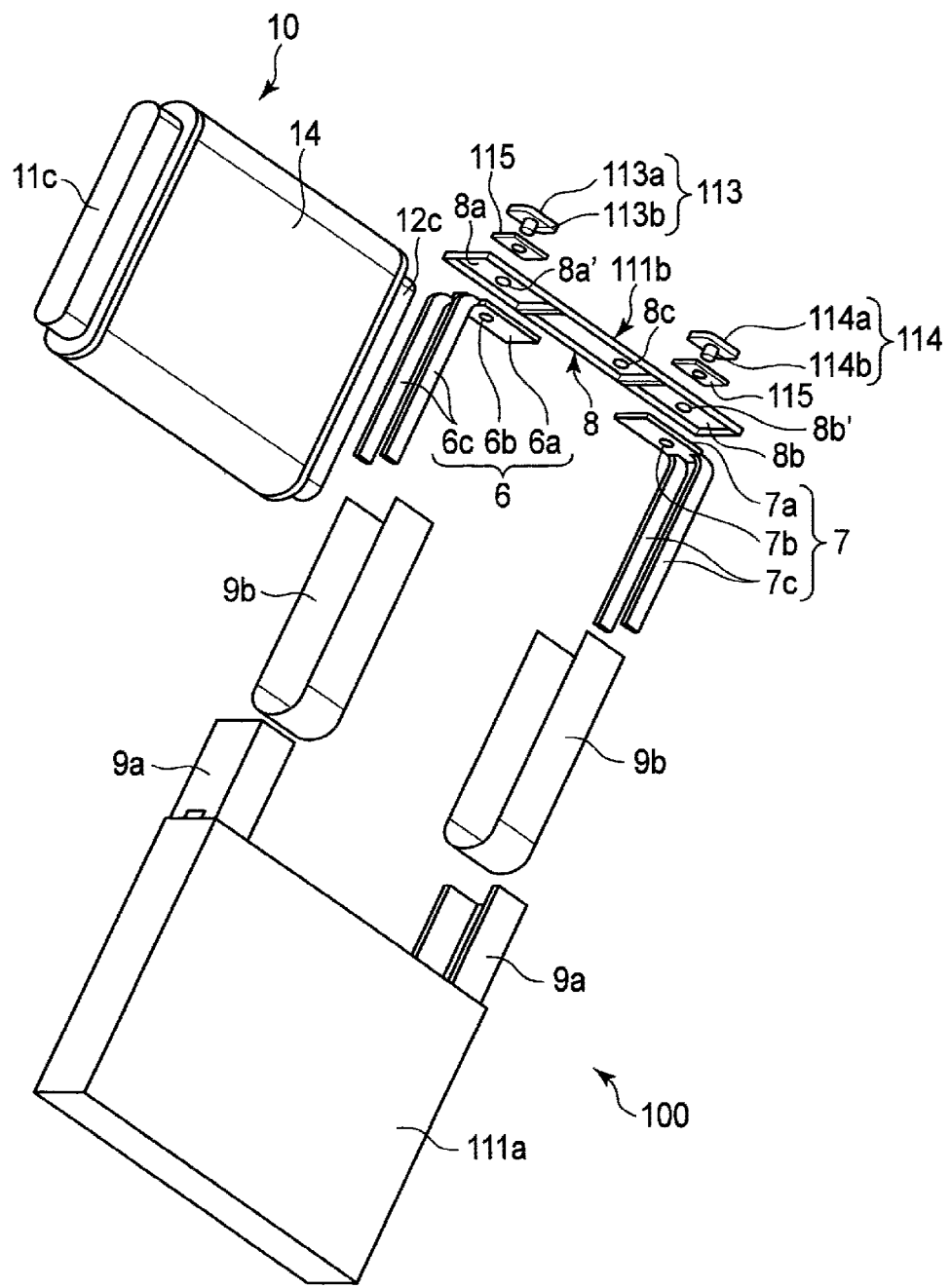
FIG. 6 is one schematic exploded perspective view of the nonaqueous electrolyte battery illustrated in FIG. 5.
Figure 7:
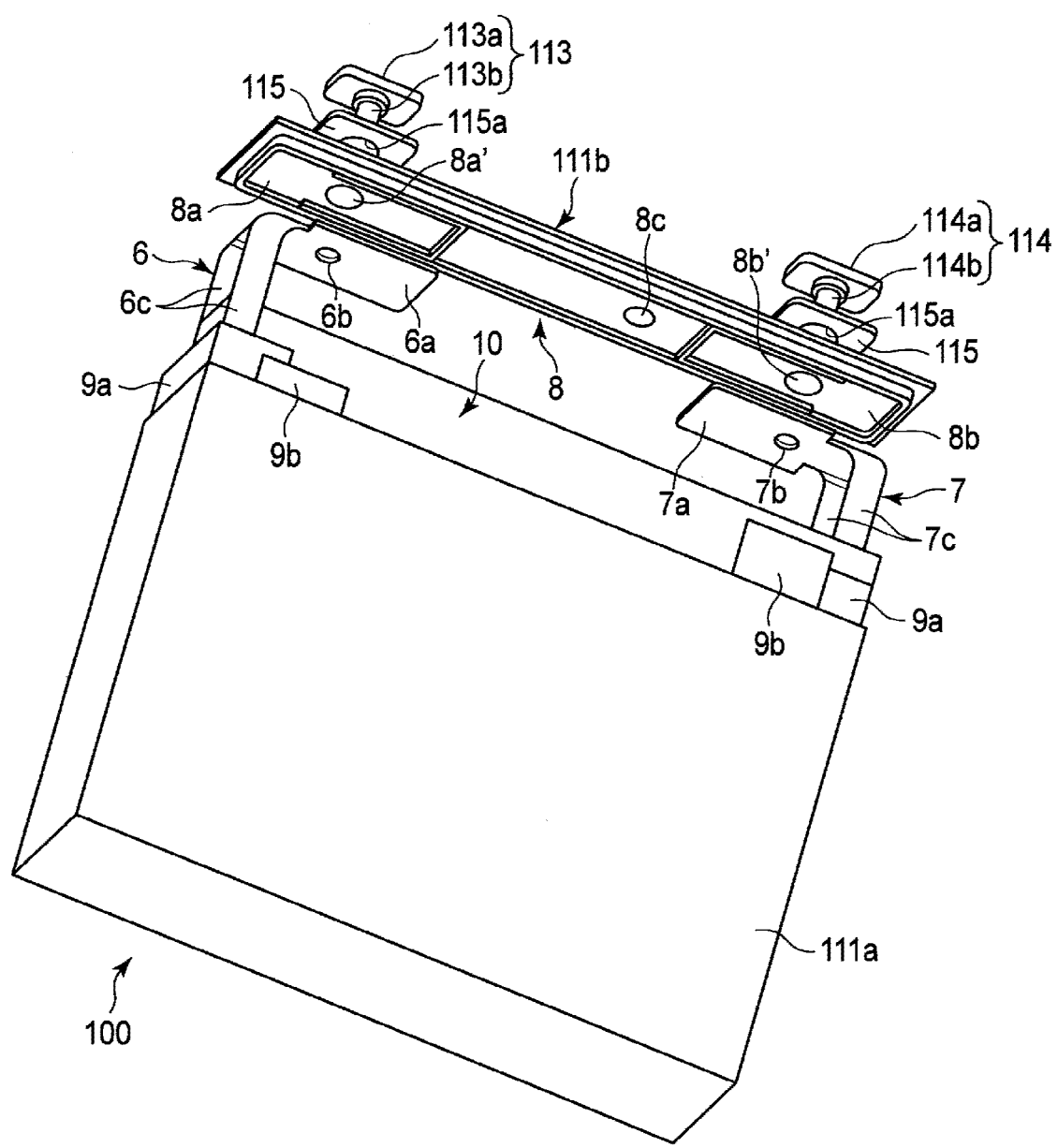
FIG. 7 is another schematic exploded perspective view of the nonaqueous electrolyte battery illustrated in FIG. 5.

As illustrated in FIGS. 5 to 7, the nonaqueous electrolyte battery 100 of this example is a prismatic battery including a container member 111, an electrode group 10 accommodated in the container member 111, a liquid nonaqueous electrolyte (not illustrated) impregnated into the electrode group 10.

The electrode group 10 is the flat wound-type electrode group 10 described with reference to FIG. 4. The portion of the electrode group 10 other than a positive electrode tab 11c and a negative electrode tab 12c is covered with an insulating tape 14.

As illustrated in FIGS. 5 to 7, the container member 111 includes a rectangular cylindrical metal container 111a with a bottom and having an opening, and a rectangular plate-shaped sealing member 111b provided on the opening of the container 111a. The sealing member 111b is joined to the opening of the container 111a by, for example, welding such as laser welding. Two through-holes (not illustrated) and an inlet port (not illustrated) are opened in the sealing member 111b.

As illustrated in FIGS. 6 and 7, the nonaqueous electrolyte battery 100 of this example further includes a positive electrode lead 6 and a negative electrode lead 7.

The positive electrode lead 6 includes a connection plate 6a with a through-hole 6b, and current-collection parts 6c bifurcating into two branches from the connection plate 6a and extending downward. Similarly, the negative electrode lead 7 includes a connection plate 7a with a through-hole 7b, and current-collection parts 7c bifurcating into two branches from the connection plate 7a and extending downward.

As illustrated in FIGS. 6 and 7, an insulator 8 is provided on a back surface of the sealing member 111b. The insulator 8 has a first concave portion 8a and a second concave portion 8b on a back surface thereof. A through-hole 8a' and a through-hole 8b' are opened in the first concave portion 8a and the second concave portion 8b, respectively, and the through-holes 8a' and 8b' communicate with the through-holes of the sealing member 111b, respectively. The connection plate 6a of the positive electrode lead 6 is provided in the first concave portion 8a, and the connection plate 7a of the negative electrode lead 7 is disposed in the second concave portion 8b. In addition, a through-hole 8c communicating with the inlet port of the sealing member 111b is opened in the insulator 8.

The positive electrode lead 6 is joined to the positive electrode tab 11c of the electrode group 10 in a state where the outer surface of the positive electrode tab 11c is sandwiched between the bifurcated current-collection parts 6c of the positive electrode lead 6. In addition, the negative electrode lead 7 is joined to the negative electrode tab 12c in a state where the outer surface of the negative electrode tab 12c is sandwiched between the bifurcated current-collection parts 7c of the negative electrode lead 7. In this way, the positive electrode lead 6 and the positive electrode tab 11c of the electrode group 10 are electrically connected to each other, and the negative electrode lead 7 and the negative electrode tab 12c of the electrode group 10 are electrically connected to each other.

As illustrated in FIGS. 6 and 7, the nonaqueous electrolyte battery 100 of this example includes two insulating members 9a. One insulating member 9a covers a joined portion between the positive electrode lead 6 and the positive electrode tab 11c. The other insulating member 9a covers a joined portion between the negative electrode lead 7 and the negative electrode tab 12c. Each of the two insulating members 9a is fixed to the electrode group 10 by a twofold insulating tape 9b.

As illustrated in FIGS. 5 to 7, the nonaqueous electrolyte battery 100 of this example further includes a positive electrode terminal 113 and a negative electrode terminal 114.

The positive electrode terminal 113 includes a rectangular head part 113a, and a shaft 113b extending downward from the back surface of the head part 113a. Similarly, the negative electrode terminal 114 includes a rectangular head part 114a, and a shaft 114b extending downward from the back surface of the head part 114a. Each of the positive electrode terminal 113 and the negative electrode terminal 114 is mounted on the upper surface of the sealing member 111b through insulating gaskets 115. The shaft 113b of the positive electrode terminal 113 is inserted into the through-hole 115a of the insulating gasket 115, the through-hole of the sealing member 111b, the through-hole 8a' of the insulator 8, and the through-hole 6b of the connection plate 6a of the positive electrode lead 6, and is caulked and fixed thereto. In addition, the shaft 114b of the negative electrode terminal 114 is inserted into the through-hole 115a of the insulating gasket 115, the through-hole of the sealing member 111b, the through-hole 8b' of the insulator 8, and the through-hole 7b of the connection plate 7a of the negative electrode lead 7, and is caulked and fixed thereto. Thus, the positive electrode terminal 113 and the positive electrode lead 6 are electrically connected to each other, and the negative electrode terminal 114 and the negative electrode lead 7 are electrically connected to each other.

In the nonaqueous electrolyte battery 100 having the above-described configuration, the injection of the nonaqueous electrolyte can be performed by accommodating the electrode group 10 in the container 111a, joining the sealing member 111b to the opening of the container 111a, and then injecting the nonaqueous electrolyte through the inlet port opened in the sealing member 111b. After the injection of the nonaqueous electrolyte, as illustrated in FIG. 5, a metallic sealing member 123 can be fitted into the inlet port and welded to seal the container member 111.

The nonaqueous electrolyte battery according to the third embodiment includes the electrode group according to the second embodiment. Thus, the nonaqueous electrolyte battery exhibiting high energy density and excellent input-and-output characteristics can be achieved.

EXAMPLES

Hereinafter, the present invention will be described in more detail with reference to examples, but the present invention is not limited to the examples described below as long as they do not depart from the gist of the invention.

EXAMPLE 1

In Example 1, a nonaqueous electrolyte battery 100 having a structure similar to that of the nonaqueous electrolyte secondary battery 100 illustrated in FIGS. 5 to 7 which includes the wound-type electrode group 10 illustrated in FIG. 4 was produced.

[Production of Positive Electrode 11]

First, lithium-nickel-cobalt-manganese composite oxide $LiNi_{1/3}Co_{1/3}Mn_{1/3}O_2$ and lithium-cobalt composite oxide $LiCoO_2$ were provided as a positive electrode active material. These were mixed so that $LiNi_{1/3}Co_{1/3}Mn_{1/3}O_2$ and $LiCoO_2$ was 2:1 to obtain an active material mixture. The active material mixture, acetylene black as a conductive agent, graphite as a further conductive agent, and polyvinylidene fluoride as a binder were mixed at a mass ratio of 100:2:3:3. The mixture thus obtained was added to N-methyl-2-pyrrolidone as a solvent and kneaded and stirred with a planetary mixer to prepare a positive electrode slurry.

Subsequently, a belt-shaped aluminum foil having a thickness of 20 µm was provided as the positive electrode current collector 11a. The positive electrode slurry previously prepared was coated on both surfaces of the aluminum foil 11a by a coating apparatus so that a coating amount per unit area was 70 g/m$^2$. At this time, a portion 11c which was not coated with the positive electrode slurry was left along a long side of the aluminum foil 11a.

Subsequently, the coated film thus obtained was dried. Subsequently, the dried coated film and the aluminum foil 11a were rolled by a roll press machine so that an electrode density (not including the aluminum foil) was 3.4 g/cm$^3$. Thus, the positive electrode 11, including the positive electrode current collector 11a with the positive electrode tab 11c and the positive electrode layer 11b provided on the surface of the positive electrode current collector 11a, was obtained.

[Production of Negative Electrode 12]

First, lithium titanate $Li_4Ti_5O_{12}$ was provided as a negative electrode active material. The active material, graphite as a conductive agent, and polyvinylidene fluoride as a binder were mixed at a mass ratio of 100:15:4. The mixture thus obtained was added to N-methyl-2-pyrrolidone as a solvent and kneaded and stirred with a planetary mixer to prepare a negative electrode slurry.

Subsequently, a belt-shaped aluminum foil having a thickness of 20 µm was provided as the negative electrode current collector 12a. The negative electrode slurry previously prepared was coated on both surfaces of the aluminum foil 12a by a coating apparatus so that a coating amount per unit area was 65 g/m$^2$. At this time, a portion 12c which was not coated with the negative electrode slurry was left along a long side of the aluminum foil.

Subsequently, the coated film thus obtained was dried. Subsequently, the dried coated film and the aluminum foil 12a were rolled by a roll press machine so that an electrode density (not including the aluminum foil) was 2.4 g/cm$^3$. Thus, the negative electrode 12, including the negative electrode current collector 12a with the negative electrode tab 12c and the negative electrode layer provided on the surface of the negative electrode current collector 12a, was obtained.

[Production of Organic Fiber-Containing Layer 13]

Polyvinylidene fluoride PVdF was used as an organic material. The PVdF was dissolved in N-methylpyrrolidone NMP serving as a solvent at a concentration of 20% by mass to prepare a material solution. The material solution was supplied from a spinning nozzle to the surface of the negative electrode 12 previously prepared at a supply rate of 6 mL/h by using a metering pump. At this time, while applying a voltage of 30 kV to the spinning nozzle by using a high voltage generator, fibers were supplied to the surface of the negative electrode layer including the end portion and a portion of the negative electrode tab 12c. Thus, the organic fiber-containing layer 13 including the PVdF fibers having a weight per unit area of 4 g/m$^2$ was formed by an electrospinning method.

Subsequently, the organic fiber-containing layer 13 was roll-pressed so that the porosity thereof became 60%. A pressing pressure was 20 kN/m. At this time, the press roll was not heated, and the roll press was performed under an environment of 25° C.

Thus, the negative electrode 12 of Example 1 including the negative electrode layer and the organic fiber-containing layer 13 provided on the negative electrode layer was obtained.

[Production of Wound Type Electrode Group 10]

The negative electrode 12 including the organic fiber-containing layer 13 provided on the surface thereof and the previously prepared positive electrode 11 were stacked in this order to obtain a stack. Subsequently, the stack was transferred to a winding apparatus, and the entire stack was bent and wound into a spiral shape. The wound body thus obtained was pressed to obtain a flat wound type electrode group 10 having the structure illustrated in FIG. 4. The press was performed at 25° C., at 50 kN, and for 120 seconds.

[Assembly of Battery Unit 100]

Each member described with reference to FIGS. 6 and 7 was provided, and a battery unit having the same structure as the nonaqueous electrolyte battery 100 illustrated in FIGS. 5 to 7 was produced by the following procedure.

First, an insulator 8 was provided on a back surface of an aluminum sealing member 111b. A head part 113a of a positive electrode terminal 113 was mounted on an upper surface of the sealing member 111b with an insulating gasket 115 interposed therebetween, and a shaft 113b of the positive electrode terminal 113 was inserted into one through-hole of the sealing member 111b and a through-hole 8a' of the insulator 8. Similarly, a head part 114a of a negative electrode terminal 114 was mounted on an upper surface of the sealing member 111b with an insulating gasket 115 interposed therebetween, and a shaft 114b of the negative electrode terminal 114 was inserted into the other through-hole of the sealing member 111b and a through-hole 8b' of the insulator 8. Thus, the sealing body 111b as illustrated in FIGS. 6 and 7 was obtained.

Subsequently, the positive electrode tab 11c of the wound-type electrode group 10 previously prepared was sandwiched between the bifurcated current-collector parts 6c of the positive electrode lead 6, and the positive electrode tab 11c and the positive electrode lead 6 were welded to each other in this state. Similarly, the negative electrode tab 12c of the wound-type electrode group 10 was sandwiched between the bifurcated current collector parts 7c of the negative electrode lead 7, and the negative electrode tab 12c and the negative electrode lead 7 were welded in this state. Subsequently, the positive electrode terminal 113 was caulked and fixed to the connection plate 6a of the positive electrode lead 6. Similarly, the negative electrode terminal 114 was caulked and fixed to the connection plate 7a of the negative electrode lead 7. In this way, the electrode group 10 and the sealing member 111b were integrated.

Subsequently, an insulating member 9a was put on the positive electrode lead 6 and the positive electrode tab 11c so as to fix them. Similarly, another insulating member 9a was put on the negative electrode lead 7 and the negative electrode tab 12c so as to fix them. Then, each of these insulating members 9a was fixed with insulating tape 9b.

The unit of the insulating member 9a, the positive electrode lead 6 and the positive electrode tab 11c which were fixed as described above, and the unit of the insulating member 9a, the negative electrode lead 7 and the negative electrode tab 12c were inserted into the aluminum container 111a. Subsequently, the sealing member 111b was welded to the opening of the container 111a by a laser to produce a battery unit 100. The produced battery unit 100 had a rectangular parallelepiped shape with a width of 10 cm, a height of 10 cm, and a thickness of 2.5 cm.

[Preparation of Nonaqueous Electrolyte]

A nonaqueous solvent was prepared by mixing ethylene carbonate and dimethyl carbonate at a ratio of 1:1. In the nonaqueous solvent, lithium hexafluorophosphate $LiPF_6$ as an electrolyte was dissolved so as to have a concentration of 1 mol/L. Thus, a nonaqueous electrolyte was obtained.

[Injection of Nonaqueous Electrolyte and Completion of Nonaqueous Electrolyte Battery 100]

The prepared nonaqueous electrolyte was injected into the battery unit 100 from the inlet port of the sealing member 111b. After the injection, the sealing member 123 made of aluminum was fitted into the inlet port, and the periphery of the sealing member 123 was welded to the sealing member 111b. Thus, the nonaqueous electrolyte battery 100 of Example 1 was completed. 20 nonaqueous electrolyte batteries were prepared, and the 20 batteries could be charged and discharged without any abnormality. That is, the yield of Example 1 was 100%.

[Measurement of Battery Resistance Value]

The nonaqueous electrolyte battery 100 of Example 1 was adjusted to SOC 50%. For the nonaqueous electrolyte battery 100 in which SOC was adjusted, AC resistance at 1 kHz in a 25° C. atmosphere was measured, and was 1.25 mΩ. This resistance value was taken as a resistance value of the nonaqueous electrolyte battery of Example 1.

[Measurement of Self-Discharge Amount]

With respect to the nonaqueous electrolyte battery 100 of Example 1, a constant current charge was performed at 1 C up to 2.8 V, a constant voltage charge was then performed until the current value reached 0.01 C, and subsequently, a constant current discharge was performed up to 1.3 V at 0.33 C. 1 C was 21 A. A discharge capacity at this time was 22.52 Ah.

Subsequently, with respect to the nonaqueous electrolyte battery 100, a constant current charge was performed up to 2.8 V at 0.2 C and at 25° C., and thereafter, a charge was performed until a current value reached 0.01 C by a constant voltage charge. After that, the nonaqueous electrolyte battery 100 was stored in a 25° C. atmosphere for one month.

Subsequently, the nonaqueous electrolyte battery 100 after the storage was discharged at 0.33 C in a 25° C. atmosphere until a voltage reached 1.3 V, and a discharge capacity was measured. The discharge capacity obtained here was taken as the capacity after the storage of the nonaqueous electrolyte battery 100 of Example 1. The discharge capacity after the storage of the nonaqueous electrolyte battery 100 of Example 1 was 21.41 Ah. That is, the self-discharge amount by the storage of the nonaqueous electrolyte battery 100 of Example 1 was 1.11 Ah.

[Measurement of Thickness of Electrode Group]

After the evaluation, the nonaqueous electrolyte battery 100 of Example 1 was disassembled, and the electrode group 10 was taken out. At the time of disassembling, the electrolyte was kept separately. After that, the electrode group 10 was put in an Al laminate film bag together with the previously-kept liquid electrolyte at a temperature of 25° C. and a dew point of −50° C. or less, sealed at a gauge pressure of −70 kPa, and then stored for 5 days. Due to this, the organic fiber-containing layer 13 was impregnated with the liquid electrolyte.

After that, the electrode group 10 was sandwiched between resinous blocks in the thickness direction, pressurized at 101.3 kPa, and the thickness TL of the electrode group put in the bag was measured. The measured thickness TL of the electrode group 10 was 23.26 mm. After that, the pressure was increased to 202.3 kPa, and the thickness TH of the electrode group 10 was measured in the same manner as described above. The measured thickness TH of the electrode group 10 was 23.00 mm. After that, when the electrode group 10 was disassembled, the number n of the organic fiber-containing layers in the thickness direction (direction of the short diameter) of the electrode group 10 was 280.

[Measurement of Thicknesses tW and tD of Organic Fiber-Containing Layer 13, Fiber Diameters dW and dD of Fiber Included in Organic Fiber-Containing Layer 13, Weight Per Unit Area of Organic Fiber-Containing Layer 13 in State of Being Impregnated with Liquid Electrolyte, and Porosity of Organic Fiber-Containing Layer 13 in State of Being Impregnation with Liquid Electrolyte]

After the evaluation, the nonaqueous electrolyte battery 100 of Example 1 was disassembled, and the electrode group 10 was taken out. At the time of disassembling, the electrolyte was kept separately. Subsequently, the negative electrode 12 having the organic fiber-containing layer provided thereon was taken out from the electrode group 10, and a sample having a square planar shape of 5 cm square was cut out therefrom to prepare a sample of the negative electrode 12. After that, this sample was sandwiched between polyethylene protective films having a thickness of 12 μm and a square of 7 cm together with 1 g of the previously-kept liquid electrolyte. When sandwiched between the protective films, a part of the liquid electrolyte may come out from the peripheral portion of the protective film. In that case, the liquid electrolyte that has come out may be wiped off with a Kimtowel or the like. After that, the sample was sealed in an Al laminate film bag under an environment of a temperature of 25° C. and a dew point of −50° C. or less, and was stored for 5 days. Thus, the organic fiber-containing layer 13 was impregnated with the liquid electrolyte. After that, the sample was taken out from the Al laminate film bag, and the thickness was measured while sandwiching the sample between the protective films. As a result, the average $t_1$ of 10 points was 102.24 μm.

Further, the fiber diameter dW of the fibers included in the organic fiber-containing layer 13 in the wet state was measured with the confocal laser microscope VK-X100 manufactured by Keyence Corporation. The fiber diameter dW was 502 nm on an average of 50 points.

Subsequently, the protective films were removed, the sample having the organic fiber-containing layer 13 was immersed in ethyl methyl carbonate for 10 minutes, the electrolyte was removed, and the solvent was dried under vacuum at 90° C. After that, the thickness of the sample was measured in the same manner, and the average $t_2$ of 10 points was 88.13 μm. At this time, the weight $w_1$ of the sample was measured. The weight $w_1$ of the sample was 0.9931 g. Further, the sample was sandwiched between the protective films in the same manner as described above, and the fiber diameter dD of the fibers included in the organic fiber-containing layer 13 in the dry state was measured with the confocal laser microscope VK-X100 manufactured by Keyence Corporation. The fiber diameter dD was 495 nm on an average of 50 points.

Subsequently, the organic fiber-containing layer 13 was scrubbed off from both surfaces of the sample of the negative electrode 12, so as not to scrub off the negative electrode layer. After that, the thickness of the sample was measured on 10 points in the same manner. The average $t_3$ of the thickness of the sample on 10 points was 73.89 μm. At this time, the weight $w_2$ of the sample was measured. The weight $w_2$ of the sample was 0.9634 g. The weight per unit area of the organic fiber-containing layer 13 in the dry state was calculated from the weight $w_1$ and the weight $w_2$, and the average value on both surfaces thereof was 5.9 g/m².

Subsequently, with respect to the scrubbed organic fiber-containing layer 13, the true density D1 was measured by using AccuPyc 1340-10 cc manufactured by Shimadzu Corporation. The true density $D_1$ was 2.85 g/cm³.

The porosity of the organic fiber-containing layer 13 in the dry state was calculated from the weight per unit area of the organic fiber-containing layer 13 and the true density $D_1$ of the organic fiber-containing layer 13 in the dry state. The porosity of the organic fiber-containing layer 13 in the dry state was 71%.

Subsequently, the sample of the negative electrode 12, from which the organic fiber-containing layer 13 was scrubbed off, was sandwiched between polyethylene protective films having a thickness of 12 μm and 7 cm square together with 1 g of the previously-kept liquid electrolyte in the same manner as described above. When sandwiched between the protective films, a part of the liquid electrolyte may come out from the peripheral portion of the protective film. In that case, the liquid electrolyte that has come out may be wiped off with a Kimtowel or the like. After that, the sample was sealed in an Al laminate film bag under an environment at a temperature of 25° C. and a dew point of −50° C. or less and stored for 5 days, and the liquid electrolyte was impregnated into the negative electrode layer. After that, the sample was taken out from the Al laminate film bag, and the thickness was measured while sandwiching the sample between the protective films. As a result, the average $t_4$ of 10 points was 74.02 μm.

The thickness tW in the wet state and the thickness tD in the dry state of the organic fiber-containing layer 13 of the nonaqueous electrolyte battery 100 of Example 1 were calculated by using the measured thicknesses $t_1$ to $t_4$ according to the procedure described above. The thickness tW was 14.11 μm, and the thickness tD in the dry state was 7.12.

(Calculation of the ratio tW/tD, the ratio dW/dD, and the ratio (TL−TB)/(tW×n))

Based on the results obtained as described above, it was found that the ratio tW/tD of the organic fiber-containing layer 13 of the nonaqueous electrolyte battery 100 of Example 1 was 1.98. In addition, the ratio dW/dD of the average fiber diameter dW of the organic fibers included in the organic fiber-containing layer 13 in the wet state to the average fiber diameter dD of the organic fibers included in the organic fiber-containing layer 13 in the dry state was 1.01. In addition, it was found that the ratio (TL−TH)/(tW×n) of the electrode group 10 of the nonaqueous electrolyte battery 100 of Example 1 was 0.066.

EXAMPLE 2

In Example 2, a negative electrode 12 of Example 2 was produced by the same procedure as in Example 1, except that an organic fiber-containing layer 13 was roll-pressed so that the porosity thereof was 36%, and the negative electrode 12 was used to produce a nonaqueous electrolyte battery 100 of Example 2. The pressure of the roll press was 43 kN/m.

With respect to the nonaqueous electrolyte battery 100 of Example 2, various measurements were performed in the same procedure as in Example 1. As a result, the ratio tW/tD of Example 2 was 2.55. The ratio dW/dD of Example 2 was 0.98. In Example 2, the porosity of the organic fiber-containing layer 13 in the dry state was 40%. The ratio (TL−TH)/(tW×n) of Example 2 was 0.055. The yield of Example 2 was 100%. The self-discharge amount by storage of the nonaqueous electrolyte battery 100 of Example 2 was 1.29 Ah. The resistance value of the nonaqueous electrolyte battery 100 of Example 2 was 1.12 mΩ.

EXAMPLE 3

In Example 3, a negative electrode 12 of Example 3 was produced by the same procedure as in Example 1, except that an organic fiber-containing layer 13 was roll-pressed so that the porosity thereof was 78%, and the negative electrode 12 was used to prepare a nonaqueous electrolyte battery 100 of Example 3. The pressure of the roll press was 12 kN/m.

With respect to the nonaqueous electrolyte battery 100 of Example 3, various measurements were performed in the same procedure as in Example 1. As a result, the ratio tW/tD of Example 3 was 1.10. The ratio dW/dD of Example 3 was 0.95. In Example 3, the porosity of the organic fiber-containing layer 13 in the dry state was 79%. The ratio (TL−TH)/(tW×n) of Example 3 was 0.100. The yield of Example 3 was 100%. The self-discharge amount by storage of the nonaqueous electrolyte battery 100 of Example 3 was 1.41 Ah. The resistance value of the nonaqueous electrolyte battery 100 of Example 3 was 1.01 mΩ.

EXAMPLE 4

In Example 4, a negative electrode 12 of Example 4 was produced by the same procedure as in Example 1, except that polyimide was used as a fiber material, and the negative electrode 12 was used to produced a nonaqueous electrolyte battery 100 of Example 4.

With respect to the nonaqueous electrolyte battery 100 of Example 4, various measurements were performed in the same procedure as in Example 1. As a result, the ratio tW/tD of Example 4 was 1.17. The ratio dW/dD of Example 4 was 1.05. In Example 4, the porosity of the organic fiber-containing layer 13 in the dry state was 82%. The ratio (TL−TH)/(tW×n) of Example 4 was 0.038. The yield of Example 4 was 100%. The self-discharge amount by storage of the nonaqueous electrolyte battery 100 of Example 4 was 1.31 Ah. The resistance value of the nonaqueous electrolyte battery 100 of Example 4 was 1.13 mΩ.

EXAMPLE 5

In Example 5, the negative electrode 12 of Example 5 was produced by the same procedure as in Example 1, except that polyamide was used as a fiber material, and the negative electrode 12 was used to produce a nonaqueous electrolyte battery 100 of Example 5.

With respect to the nonaqueous electrolyte battery 100 of Example 5, various measurements were performed in the same procedure as in Example 1. As a result, the ratio tW/tD of Example 5 was 1.89. The ratio dW/dD of Example 5 was 1.02. In Example 5, the porosity of the organic fiber-containing layer 13 in the dry state was 62%. The ratio (TL−TH)/(tW×n) of Example 5 was 0.002. The yield of Example 5 was 100%. The self-discharge amount by storage of the nonaqueous electrolyte battery 100 of Example 5 was 1.14 Ah. The resistance value of the nonaqueous electrolyte battery 100 of Example 5 was 1.27 mΩ.

EXAMPLE 6

In Example 6, a negative electrode 12 of Example 6 was produced by the same procedure as in Example 1, except that polyamide-imide was used as a fiber material, and the negative electrode 12 was used to produce a nonaqueous electrolyte battery 100 of Example 6.

With respect to the nonaqueous electrolyte battery 100 of Example 6, various measurements were performed in the same procedure as in Example 1. As a result, the ratio tW/tD of Example 6 was 1.96. The ratio dW/dD of Example 6 was 0.98. In Example 6, the porosity of the organic fiber-containing layer 13 in the dry state was 60%. The ratio (TL−TH)/(tW×n) of Example 6 was 0.033. The yield of Example 6 was 100%. The self-discharge amount by storage of the nonaqueous electrolyte battery 100 of Example 6 was 1.13 Ah. The resistance value of the nonaqueous electrolyte battery 100 of Example 6 was 1.24 mΩ.

COMPARATIVE EXAMPLE 1

In Comparative Example 1, a negative electrode of Comparative Example 1 was produced by the same procedure as in Example 1, except that an organic fiber-containing layer 13 was roll-pressed while heating a press roll at 140° C., and the negative electrode was used to produce a nonaqueous electrolyte battery of Comparative Example 1.

With respect to the nonaqueous electrolyte battery of Comparative Example 1, various measurements were performed in the same procedure as in Example 1. As a result, the ratio tW/tD of Comparative Example 1 was 1.00. The ratio dW/dD of Comparative Example 1 was 1.07. In Comparative Example 1, the porosity of the organic fiber-containing layer 13 in the dry state was 80%. The ratio (TL−TH)/(tW×n) of Comparative Example 1 was 0.000. The yield of Comparative Example 1 was 100%. The self-discharge amount by storage of the nonaqueous electrolyte battery of Comparative Example 1 was 0.92 Ah. The resistance value of Comparative Example 1 was 1.67 mΩ.

COMPARATIVE EXAMPLE 2

In Comparative Example 2, a negative electrode of Comparative Example 2 was produced by the same procedure as in Example 1, except that polyamide was used as a fiber material and PVdF was used as a binder in forming an organic fiber-containing layer, and the negative electrode was used to produce a nonaqueous electrolyte battery of Comparative Example 2.

With respect to the nonaqueous electrolyte battery of Comparative Example 2, various measurements were performed in the same procedure as in Example 1. As a result, the ratio tW/tD of Comparative Example 2 was 1.00. The ratio dW/dD of Comparative Example 2 was 1.06. In Comparative Example 2, the porosity of the organic fiber-containing layer 13 in the dry state was 80%. The ratio (TL−TH)/(tW×n) of Comparative Example 2 was 0.040. The yield of Comparative Example 2 was 100%. The self-discharge amount by storage of the nonaqueous electrolyte battery of Comparative Example 2 was 0.97 Ah. The resistance value of Comparative Example 2 was 1.73 mΩ.

COMPARATIVE EXAMPLE 3

In Comparative Example 3, a negative electrode of Comparative Example 3 was produced by the same procedure as in Example 1, except that an organic fiber-containing layer 13 was roll-pressed so that the porosity thereof was 91%, and the negative electrode was used to produce a nonaqueous electrolyte battery 100 of Comparative Example 3. The pressure of the roll press was 3 kN/m. In Comparative Example 3, the porosity of the organic fiber-containing layer 13 in the dry state was 91%.

After producing 20 nonaqueous electrolyte batteries, charge and discharge were performed thereon, and 17 batteries could not be charged and discharged. When disassembling the batteries which could not be charged and discharged, the organic fiber-containing layer 13 was peeled off from the negative electrode 12, and there were a plurality of places where the positive electrode 11 and the negative electrode 12 were in contact with each other.

With respect to three nonaqueous electrolyte batteries which could be charged and discharged, various measurements were performed in the same procedure as in Example 1. As a result, the self-discharge amount by storage of the nonaqueous electrolyte battery of Comparative Example 3 was 10.38 Ah.

COMPARATIVE EXAMPLE 4

In Comparative Example 4, a negative electrode of Comparative Example 4 was produced by the same procedure as in Example 1, except that an organic fiber-containing layer 13 was roll-pressed so that the porosity thereof was 28%, and the negative electrode was used to produce a nonaqueous electrolyte battery of Comparative Example 4. The pressure of the roll press was 60 kN/m.

With respect to the nonaqueous electrolyte battery of Comparative Example 4, various measurements were performed in the same procedure as in Example 1. As a result, the ratio tW/tD of Comparative Example 4 was 3.26. The ratio dW/dD of Comparative Example 4 was 1.02. In Comparative Example 4, the porosity of the organic fiber-containing layer in the dry state was 38%. The ratio (TL−TH)/(tW×n) of Comparative Example 4 was 0.045. The yield of Comparative Example 4 was 100%. The self-discharge amount by storage of the nonaqueous electrolyte battery of Comparative Example 4 was 0.76 Ah. The resistance value of the nonaqueous electrolyte battery of Comparative Example 4 was 2.02 mΩ.

COMPARATIVE EXAMPLE 5

In Comparative Example 5, a negative electrode 12 of Comparative Example 5 was produced by the same procedure as in Example 1, except that polyethylene oxide was used as a fiber material, and the negative electrode 12 was used to produce a nonaqueous electrolyte battery 100 of Comparative Example 5.

With respect to the nonaqueous electrolyte battery of Comparative Example 5, various measurements were performed in the same procedure as in Example 1. As a result, the ratio tW/tD of Comparative Example 5 was 2.44. The ratio dW/dD of Comparative Example 5 was 1.85. In Comparative Example 5, the porosity of the organic fiber-containing layer in the dry state was 69%. The ratio (TL−TH)/(tW×n) of Comparative Example 5 was 0.162. The yield of Comparative Example 5 was 100%. The self-discharge amount by storage of the nonaqueous electrolyte battery of Comparative Example 5 was 0.56 Ah. The resistance value of the nonaqueous electrolyte battery of Comparative Example 5 was 2.15 mΩ.

[Results]

The results of Examples 1 to 6 and Comparative Examples 1 to 5 are shown in Tables 1 to 4 below.

TABLE 1

|  | Fiber Material | $t_1$ (μm) | $t_2$ (μm) | $t_3$ (μm) | $t_4$ (μm) | $w_1$ (g) | $w_2$ (g) |
| --- | --- | --- | --- | --- | --- | --- | --- |
| Example 1 | PVdF | 102.24 | 88.13 | 73.89 | 74.02 | 0.9931 | 0.9634 |
| Example 2 | PVdF | 97.45 | 83.06 | 73.91 | 74.13 | 0.9935 | 0.9543 |
| Example 3 | PVdF | 84.43 | 83.27 | 73.88 | 74.07 | 0.9846 | 0.9703 |
| Example 4 | polyimide | 88.35 | 86.14 | 73.87 | 74.02 | 0.9821 | 0.9747 |
| Example 5 | polyamide | 103.14 | 89.25 | 73.86 | 74.04 | 0.9945 | 0.9738 |
| Example 6 | polyamide-imide | 102.15 | 88.23 | 73.87 | 74.02 | 0.9937 | 0.9736 |
| Comparative Example 1 | PVdF | 95.35 | 95.23 | 73.95 | 74.05 | 0.9932 | 0.9633 |
| Comparative Example 2 | PVdF | 95.34 | 95.11 | 73.83 | 74.04 | 0.9934 | 0.9637 |
| Comparative Example 3 | PVdF | 83.35 | 83.24 | 73.81 | 74.05 | 0.9644 | 0.9585 |
| Comparative Example 4 | PVdF | 97.26 | 80.98 | 73.86 | 74.02 | 0.9958 | 0.9643 |
| Comparative Example 5 | polyethylene oxide | 97.42 | 83.46 | 73.89 | 74.03 | 0.9782 | 0.9674 |

TABLE 2

|  | tW (μm) | tD (μm) | tW/tD | dW (nm) | dD (nm) | dW/dD | True Density (g/cc) |
| --- | --- | --- | --- | --- | --- | --- | --- |
| Example 1 | 14.11 | 7.12 | 1.98 | 502 | 495 | 1.01 | 2.85 |
| Example 2 | 11.66 | 4.58 | 2.55 | 515 | 524 | 0.98 | 2.85 |
| Example 3 | 5.18 | 4.70 | 1.10 | 601 | 634 | 0.95 | 2.85 |
| Example 4 | 7.17 | 6.14 | 1.17 | 612 | 584 | 1.05 | 1.37 |
| Example 5 | 14.55 | 7.70 | 1.89 | 657 | 641 | 1.02 | 1.40 |
| Example 6 | 14.07 | 7.18 | 1.96 | 553 | 567 | 0.98 | 1.41 |
| Comparative Example 1 | 10.65 | 10.64 | 1.00 | 519 | 486 | 1.07 | 2.85 |
| Comparative Example 2 | 10.65 | 10.64 | 1.00 | 525 | 493 | 1.06 | 2.85 |
| Comparative Example 3 | 4.65 | 4.72 | 0.99 | 523 | 502 | 1.04 | 2.85 |
| Comparative Example 4 | 11.62 | 3.56 | 3.26 | 535 | 527 | 1.02 | 2.85 |
| Comparative Example 5 | 11.70 | 4.79 | 2.44 | 975 | 527 | 1.85 | 1.45 |

TABLE 3

|  | Layer of Organic Fiber in Dry State | | | | | |
| --- | --- | --- | --- | --- | --- | --- |
|  | Porosity (%) | Weight per Unit Area (g/m²) | TH (mm) | TL (mm) | n | (TL-TH)/(tW × n) |
| Example 1 | 71 | 5.9 | 23.00 | 23.26 | 280 | 0.066 |
| Example 2 | 40 | 7.8 | 23.19 | 23.38 | 290 | 0.055 |
| Example 3 | 79 | 2.9 | 23.13 | 23.29 | 315 | 0.100 |
| Example 4 | 82 | 1.5 | 23.46 | 23.54 | 310 | 0.038 |
| Example 5 | 62 | 4.1 | 23.38 | 23.39 | 280 | 0.002 |
| Example 6 | 60 | 4.0 | 23.12 | 23.25 | 280 | 0.033 |
| Comparative Example 1 | 80 | 6.0 | 23.46 | 23.46 | 295 | 0.000 |
| Comparative Example 2 | 80 | 5.9 | 23.33 | 23.46 | 295 | 0.040 |
| Comparative Example 3 | 91 | 1.2 | 23.29 | 23.48 | 320 | 0.129 |
| Comparative Example 4 | 38 | 6.3 | 23.20 | 23.35 | 290 | 0.045 |
| Comparative Example 5 | 69 | 2.2 | 22.82 | 23.37 | 290 | 0.162 |

TABLE 4

|  | Yield (%) | Resistance (mΩ) | Discharge Capacity before Storage (Ah) | Discharge Capacity after Storage (Ah) | Self-Discharge Amount by Storage (Ah) |
| --- | --- | --- | --- | --- | --- |
| Example 1 | 100 | 1.25 | 22.52 | 21.41 | 1.11 |
| Example 2 | 100 | 1.12 | 22.74 | 21.45 | 1.29 |
| Example 3 | 100 | 1.01 | 22.95 | 21.54 | 1.41 |
| Example 4 | 100 | 1.13 | 22.72 | 21.41 | 1.31 |
| Example 5 | 100 | 1.27 | 22.56 | 21.42 | 1.14 |
| Example 6 | 100 | 1.24 | 22.57 | 21.44 | 1.13 |
| Comparative Example 1 | 100 | 1.67 | 22.35 | 21.43 | 0.92 |
| Comparative Example 2 | 100 | 1.73 | 22.42 | 21.45 | 0.97 |
| Comparative Example 3 | 15 | 0.85 | 21.32 | 10.94 | 10.38 |
| Comparative Example 4 | 100 | 2.02 | 22.74 | 21.98 | 0.76 |
| Comparative Example 5 | 100 | 2.15 | 22.31 | 21.75 | 0.56 |

[Consideration]

It can be seen from the results shown in Table 4 that the nonaqueous electrolyte batteries 100 of Examples 1 to 6 have a low resistance value, and can suppress the self-discharge by storage.

As shown in Table 2, in the nonaqueous electrolyte batteries 100 of Examples 1 to 6, the organic fiber-containing layer 13 has a thickness tW of 14.55 μm or less even in the wet state. The nonaqueous electrolyte batteries 100 of Examples 1 to 6 could achieve excellent yields as shown in Table 4 even when thin organic fiber-containing layers were used as described above.

That is, the use of the negative electrodes 12 of Examples 1 to 6 made it possible to realize the nonaqueous electrolyte battery 100 capable of exhibiting a high energy density and excellent input-and-output characteristics.

Specifically, it can be seen from the results shown in Table 4 that the nonaqueous electrolyte batteries 100 of Examples 1 to 6 had a lower resistance than those of the nonaqueous electrolyte batteries of Comparative Examples 1, 2, 4, and 5. It is considered that the reason why the resistance of the nonaqueous electrolyte battery of Comparative Example 1 was higher than those of the nonaqueous electrolyte batteries 100 of Examples 1 to 6 was that, since the organic fiber-containing layer 13 was subjected to a hot roll press, the organic fiber-containing layer 13 was not increased by the impregnation with the liquid electrolyte. It is considered that the reason why the resistance of the nonaqueous electrolyte battery of Comparative Example 2 was higher than those of the nonaqueous electrolyte batteries 100 of Examples 1 to 6 was that, since the binder was used in forming the organic fiber-containing layer 13, the porosity of the organic fiber-containing layer 13 did not become large even by the impregnation with the liquid electrolyte. In Comparative Example 4, the ratio tW/tD was greater than 2.55. it is considered that this is because the organic fiber-containing layer 13 was pressed with a relatively large load of 60 kN/m. The organic fiber-containing layer 13 pressed with such an excessive load could not exhibit a high porosity even in the wet state. As a result, in the nonaqueous electrolyte battery of Comparative Example 4, it is considered that the diffusion of Li ions was inhibited and thus the resistance was high. It is considered that the resistance of the nonaqueous electrolyte battery of Comparative Example 5 was high because the ratio dW/dD was greater than 1.05, so that the fiber diameter of the organic fiber included in the organic fiber-containing layer 13 became too large by the impregnation with the liquid electrolyte, and the organic fiber-containing layer 13 could not exhibit a high porosity even in the wet state.

In addition, it can be seen from the results shown in Table 4 that the nonaqueous electrolyte batteries 100 of Examples 1 to 6 had better yield than that of the nonaqueous electrolyte battery of Comparative Example 3, and the self-discharge by storage could be more suppressed than the nonaqueous electrolyte battery of Comparative Example 3. In the nonaqueous electrolyte battery of Comparative Example 3, it can be considered that, since the pressure during the roll press of the organic fiber-containing layer 13 was too weak, the organic fiber-containing layer 13 was likely to be damaged during the production of the battery and the yield was reduced. In addition, in the nonaqueous electrolyte battery of Comparative Example 3, it is considered that the positive electrode and the negative electrode came into contact with each other due to the organic fiber separated from the negative electrode and released into the liquid electrolyte due to the impregnation with the liquid electrolyte, and the self-discharge amount was increased.

EXAMPLE 7

In Example 7, a negative electrode 12 of Example 7 was produced by the same procedure as in Example 6, except that an average value of weights per unit area of organic fiber-containing layers 13 on both surfaces was set to 0.5 g/m$^2$, and the negative electrode 12 was used to produce a nonaqueous electrolyte battery 100 of Example 7.

With respect to the nonaqueous electrolyte battery 100 of Example 7, various measurements were performed in the same procedure as in Example 1. As a result, the ratio tW/tD of Example 7 was 2.36. The ratio dW/dD of Example 7 was 0.99. In Example 7, the porosity of the organic fiber-containing layer 13 in the dry state was 81%. The ratio (TL−TH)/(tW×n) of Example 7 was 0.086. The yield of Example 7 was 100%. The self-discharge amount by storage of the nonaqueous electrolyte battery 100 of Example 7 was 1.54 Ah. The resistance value of the nonaqueous electrolyte battery 100 of Example 7 was 1.16 mΩ.

EXAMPLE 8

In Example 8, a negative electrode of Example 8 was produced by the same procedure as in Example 1, except that an organic fiber-containing layer 13 was roll-pressed while heating a press roll at 60° C., and the negative electrode was used to produce a nonaqueous electrolyte battery of Example 8.

With respect to the nonaqueous electrolyte battery 100 of Example 8, various measurements were performed in the same procedure as in Example 1. As a result, the ratio tW/tD of Example 8 was 1.11. The ratio dW/dD of Example 8 was 0.96. In Example 8, the porosity of the organic fiber-containing layer 13 in the dry state was 79%. The ratio (TL−TH)/(tW×n) of Example 8 was 0.098. The yield of Example 8 was 100%. The self-discharge amount by storage of the nonaqueous electrolyte battery 100 of Example 8 was 1.39 Ah. The resistance value of the nonaqueous electrolyte battery 100 of Example 8 was 1.02 mΩ.

COMPARATIVE EXAMPLE 6

In Comparative Example 6, a negative electrode of Comparative Example 6 was prepared by the same procedure as in Example 1, except that a roll press was not performed after an organic fiber-containing layer 13 was formed, and the negative electrode was used to prepare a nonaqueous electrolyte battery 100 of Comparative Example 6.

In Comparative Example 6, a plurality of nonaqueous electrolyte batteries were produced as in Example 1. However, the yield of Comparative Example 6 was worse than that of Example 1.

With respect to the nonaqueous electrolyte batteries of Comparative Example 6 which could be charged and discharged, various measurements were performed in the same procedure as in Example 1. As a result, the self-discharge amount by storage of the nonaqueous electrolyte battery of Comparative Example 6 was 13.26 Ah.

[Results]

The results of various measurements performed on Examples 7 and 8 and Comparative Example 6 are shown in Tables 5 to 8 below.

TABLE 5

| | Fiber Material | $t_1$ (µm) | $t_2$ (µm) | $t_3$ (µm) | $t_4$ (µm) | $w_1$ (g) | $w_2$ (g) |
|---|---|---|---|---|---|---|---|
| Example 7 | polyamide-imide | 83.14 | 77.65 | 73.79 | 74.03 | 0.9761 | 0.9735 |
| Example 8 | PVdF | 84.45 | 83.26 | 73.87 | 74.07 | 0.9842 | 0.9701 |
| Comparative Example 6 | PVdF | 83.39 | 83.25 | 73.88 | 74.04 | 0.9644 | 0.9597 |

TABLE 6

| | tW (µm) | tD (µm) | tW/tD | dW (nm) | dD (nm) | dW/dD | True Density (g/cc) |
|---|---|---|---|---|---|---|---|
| Example 7 | 4.56 | 1.93 | 2.36 | 1403 | 1424 | 0.99 | 1.41 |
| Example 8 | 5.19 | 4.70 | 1.11 | 605 | 632 | 0.96 | 2.85 |
| Comparative Example 6 | 4.68 | 4.69 | 1.00 | 524 | 503 | 1.04 | 2.85 |

TABLE 7

| | Layer of Organic Fiber in Dry State | | | | | |
|---|---|---|---|---|---|---|
| | Porosity (%) | Weight per Unit Area (g/m²) | TH (mm) | TL (mm) | n | (TL-TH)/ (tW × n) |
| Example 7 | 81 | 0.5 | 23.11 | 23.22 | 280 | 0.086 |
| Example 8 | 79 | 2.8 | 23.12 | 23.28 | 315 | 0.098 |
| Comparative Example 6 | 93 | 0.9 | 22.82 | 23.37 | 290 | 0.406 |

TABLE 8

| | Resistance (mΩ) | Discharge Capacity before Storage (Ah) | Discharge Capacity after Storage (Ah) | Self-Discharge Amount by Storage (Ah) |
|---|---|---|---|---|
| Example 7 | 1.16 | 22.61 | 21.07 | 1.54 |
| Example 8 | 1.02 | 22.91 | 21.52 | 1.39 |
| Comparative Example 6 | 0.83 | 21.15 | 7.89 | 13.26 |

[Consideration]

It can be seen from the results shown in Tables 4 and 8 that the nonaqueous electrolyte batteries of Examples 7 and 8 have low resistance values and can suppress the self-discharge by storage, as in the nonaqueous electrolyte batteries 100 of Examples 1 to 6.

In addition, as shown in Table 6, in the nonaqueous electrolyte batteries 100 of Examples 7 and 8, the organic fiber-containing layers 13 have thicknesses tW of 4.56 μm and 5.19 μm even in the wet state, respectively. The nonaqueous electrolyte batteries of Examples 7 and 8 could achieve excellent yields as described above even when thin organic fiber-containing layers were used.

That is, the use of the negative electrodes 12 of Examples 7 and 8 made it possible to realize the nonaqueous electrolyte battery 100 capable of exhibiting a high energy density and excellent input-and-output characteristics.

It is considered that the reason why the yield of Comparative Example 6 was low and the self-discharge amount of the nonaqueous electrolyte battery 100 of Comparative Example 6 was high was that the organic fiber-containing layer 13 was peeled off from the negative electrode 12 as described above.

Hereinafter, the reason why the electrode according to the first embodiment can be obtained by the method described in the above embodiment will be described with reference to FIGS. 8 and 9.

FIG. 8 is an enlarged schematic cross-sectional view of an organic fiber-containing layer included in an example of the electrode according to the first embodiment, in a dry state. FIG. 9 is a schematic enlarged cross-sectional view illustrating a state in which the organic fiber-containing layer illustrated in FIG. 8 is impregnated with a liquid electrolyte.

As illustrated in FIG. 8, in the organic fiber-containing layer 4 formed on the surface of the electrode layer 3 by the electrospinning method, the organic fibers 40 are deposited while entangling with each other. By roll-pressing such an organic fiber-containing layer 4 at a temperature lower than a softening point of the organic fiber material, a frictional force is generated among the organic fibers 40, and, for example as illustrated in FIG. 8, the organic fiber-containing layer 4 is in a compressed state. In addition, the roll press at a temperature lower than the softening point of the organic fiber material can prevent the organic fibers 40 from being fused together. The roll press is preferably performed at a temperature from room temperature to 60° C., and more preferably at room temperature. The room temperature is, for example, a temperature within a range of 20° C. to 30° C.

When the organic fiber-containing layer 4 which is in such a compressed state is impregnated with the liquid electrolyte to be in the wet state, the surfaces of the organic fibers 40 get wet with the liquid electrolyte 5, and thus, the frictional force among the organic fibers 40 is weakened. Due to the organic fiber's own rigidity, a deforming force is generated in the organic fiber 40 to reduce warpage. As a result, for example, as indicated by an arrow in FIG. 9, a force for releasing the entanglement of the organic fibers 40 included in the organic fiber-containing layer 4 is generated, and the apparent volume of the organic fiber-containing layer 4 increases. On the other hand, the average fiber diameter of the organic fibers 40 is not much changed by the impregnation with the liquid electrolyte 5. As a result, the porosity and the film thickness of the organic fiber-containing layer 4 increase. The organic fiber-containing layer 4 exhibiting the behavior as described above has a thickness ratio tW/tD within a range of 1.1 to 2.25 and a ratio dW/dD of an average fiber diameter of the organic fibers 40 within a range of 0.95 to 1.05.

On the other hand, when the organic fiber-containing layer is roll-pressed while being heated at a temperature higher than a softening point of the organic fiber material, the organic fibers are fused together. Even when the organic fiber-containing layer compressed as described above is impregnated with the liquid electrolyte, the entanglement of the organic fibers are not released or are hardly released. Also, when the organic fibers are bonded together by a binder, the organic fibers are bonded in a state of being entangled with each other, and thus, the entanglement of the organic fibers are not released or are hardly released even when impregnated with the liquid electrolyte. It is considered that this is the reason that the ratio tW/tD of Comparative Examples 1 and 2 was less than 1.1.

In addition, if the roll press is not performed or the pressure at the time of roll press is small, the organic fiber-containing layer tends to be peeled off from the electrode layer when impregnated with the liquid electrolyte. This is considered to be because adhesion between the organic fiber and the electrode layer and adhesion among the organic fibers weaken due to the liquid electrolyte.

In addition, the roll press of the organic fiber-containing layer performed in each of Examples is to compress the organic fiber-containing layer at a linear pressure of 10 kN/m or more. On the other hand, the press performed on the wound body obtained by winding the stack produced by using the negative electrode and the positive electrode is a press which applies a pressure on the surface. Therefore, the load applied to the organic fiber-containing layer by the press to the wound body is smaller than the load applied to the organic fiber-containing layer by the roll press.

For example, in Comparative Example 3, the pressure during the roll press of the organic fiber-containing layer 13 was too low. In addition, in Comparative Example 6, the wound body was produced without subjecting the organic fiber-containing layer formed on the negative electrode to roll-pressing, and the wound body is pressed. Therefore, in each of Comparative Example 3 and Comparative Example 6, the organic fiber-containing layer was not sufficiently pressed. As a result, it is considered that in the nonaqueous electrolyte batteries 100 of Comparative Example 3 and Comparative Example 6, a portion of the organic fiber-containing layer was peeled off from the negative electrode by the liquid electrolyte, and this portion led to an increase in the self-discharge.

The electrode according to at least one embodiment and Example explained above includes the electrode layer and the organic fiber-containing layer. The organic fiber-containing layer is provided on the electrode layer. The organic fiber-containing layer includes the organic fiber. The organic fiber-containing layer has the ratio tW/tD within the range of 1.1 to 2.55, where tW is the thickness [μm] of the organic fiber-containing layer in the wet state and tD is a thickness [μm] of the organic fiber-containing layer in the dry state. The ratio dW/dD is within the range of 0.95 to 1.05, where dW is the average fiber diameter [nm] of the organic fiber included in the organic fiber-containing layer in the wet state, and dD is the average fiber diameter [nm] of the organic fiber included in the organic fiber-containing layer in the dry state. Due to these, the electrode can include the organic fiber-containing layer which is thin and has high porosity. As a result, the electrode can achieve a nonaqueous electrolyte battery exhibiting high energy density and excellent input-and-output characteristics.

While certain embodiments of the present invention have been described, these embodiments have been presented by way of example only, and are not intended to limit the scope of the invention. The novel embodiments may be embodied in a variety of other forms, and various omissions, substitutions and changes may be made without departing from the spirit of the invention. The accompanying claims and their equivalents are intended to cover such forms or modifications as would fall within the scope and spirit of the invention.

What is claimed is:

1. An electrode comprising:
   an electrode layer; and
   an organic fiber-containing layer provided on the electrode layer and comprising an organic fiber,
   wherein the organic fiber-containing layer has a ratio tW/tD within a range of 1.1 to 2.55, where tW is a thickness [μm] of the organic fiber-containing layer in a wet state of being impregnated with a liquid electrolyte of 500 mg or more per 1 cm$^3$, and tD is a thickness [μm] of the organic fiber-containing layer in a dry state in which an impregnated amount of the liquid electrolyte per 1 cm$^3$ is 10 mg or less, and
   a ratio dW/dD is within a range of 0.95 to 1.05, where dW is an average fiber diameter [nm] of the organic fiber comprised in the organic fiber-containing layer in the wet state, and dD is an average fiber diameter [nm] of the organic fiber comprised in the organic fiber-containing layer in the dry state.

2. The electrode according to claim 1, wherein the organic fiber-containing layer in the dry state has a porosity within a range of 40% to 82%.

3. The electrode according to claim 1, wherein the organic fiber-containing layer in the dry state has a weight per unit area within a range of 0.5 g/m$^2$ to 4 g/m$^2$.

4. The electrode according to claim 1, wherein the organic fiber-containing layer in the dry state has a weight per unit area within a range of 1 g/m$^2$ to 4 g/m$^2$.

5. The electrode according to claim 1, wherein the ratio tW/tD of the thicknesses is from 1.2 to 2.3.

6. The electrode according to claim 1, wherein the ratio tW/tD of the thicknesses is from 1.3 to 2.1.

7. The electrode according to claim 1, wherein the ratio dW/dD of the average fiber diameters is from 0.96 to 1.04.

8. The electrode according to claim 1, wherein the ratio dW/dD of the average fiber diameters is from 0.98 to 1.02.

9. The electrode according to claim 1, wherein the organic fiber comprises at least one organic compound selected from the group consisting of polyimide, polyamide, polyamide-imide, polyvinylidene fluoride, polyolefin, cellulose, polyvinyl alcohol, and polyacrylonitrile.

10. An electrode group comprising:
    a positive electrode comprising a positive electrode layer; and
    a negative electrode comprising a negative electrode layer,
    wherein at least one of the positive electrode and the negative electrode is the electrode according to claim 1, and
    the organic fiber-containing layer is provided between the positive electrode layer and the negative electrode layer.

11. The electrode group according to claim 10, wherein the electrode group is a flat wound-type electrode group having a cross-section having a long diameter and a short diameter,
    the electrode group has a thickness TL [mm] when pressurized at 101.3 kPa in a state in which the organic fiber-containing layer is in the wet state, and a thickness TH [mm] when pressurized at 202.6 kPa in a state in which the organic fiber-containing layer is in the wet state, and a number of the organic fiber-containing layers in a direction of the short diameter of the electrode group is $n_1$, and
    the thickness TH, the thickness TL, the thickness tW, and the number $n_1$ of the organic fiber-containing layers satisfy the following formula:
    $$0<(TL-TH)/(tW\times n_1)\leq 0.1.$$

12. The electrode group according to claim 10, wherein the electrode group has a structure in which a plurality of positive electrodes and a plurality of negative electrodes are alternately stacked,
    the electrode group has a thickness TL [mm] when pressurized at 101.3 kPa in a state in which the organic fiber-containing layer is in the wet state, and a thickness TH [mm] when pressurized at 202.6 kPa in a state in which the organic fiber-containing layer is in the wet state, and a number of the organic fiber-containing layers in a stacking direction is $n_2$,
    the thickness TH, the thickness TL, the thickness tW, and the number $n_2$ of the organic fiber-containing layers satisfy the following formula:
    $$0<(TL-TH)/(tW\times n_2)\leq 0.1.$$

13. The electrode group according to claim 10, wherein the negative electrode layer comprises a lithium-titanium composite oxide.

14. A nonaqueous electrolyte battery comprising:
    the electrode group according to claim 10; and
    a nonaqueous electrolyte impregnated into the electrode group.

* * * * *